(12) United States Patent
Nakanishi et al.

(10) Patent No.: US 9,652,075 B2
(45) Date of Patent: *May 16, 2017

(54) DISPLAY DEVICE WITH CAPACITIVE TOUCH SENSOR WITH SLIT FORMED IN A SURFACE OF A DETECTING ELECTRODE OPPOSED TO A SCANNING ELECTRODE TO REALIZE DETECTION WITH HIGH ACCURACY

(71) Applicant: Japan Display Inc., Tokyo (JP)

(72) Inventors: Takayuki Nakanishi, Aichi (JP); Koji Noguchi, Kanagawa (JP); Koji Ishizaki, Aichi (JP); Yasuyuki Teranishi, Aichi (JP); Takeya Takeuchi, Aichi (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/244,898

(22) Filed: Aug. 23, 2016

(65) Prior Publication Data

US 2016/0357332 A1 Dec. 8, 2016

Related U.S. Application Data

(63) Continuation of application No. 14/743,547, filed on Jun. 18, 2015, now Pat. No. 9,454,279, which is a (Continued)

(30) Foreign Application Priority Data

Apr. 20, 2009 (JP) .................. 2009-102319

(51) Int. Cl.
*G06F 3/041* (2006.01)
*G02F 1/1333* (2006.01)
(Continued)

(52) U.S. Cl.
CPC ........ *G06F 3/0416* (2013.01); *G02F 1/13338* (2013.01); *G06F 3/044* (2013.01);
(Continued)

(58) Field of Classification Search
CPC ....................................................... G06F 3/416
See application file for complete search history.

(56) References Cited

U.S. PATENT DOCUMENTS 5,952,901 A 9/1999 Nakano
6,603,446 B1 8/2003 Kanazawa et al.
(Continued)

FOREIGN PATENT DOCUMENTS

GB 2435998 9/2007
JP 2009-120334 5/1997
(Continued)

*Primary Examiner* — Joseph Haley
*Assistant Examiner* — Karin Kiyabu
(74) *Attorney, Agent, or Firm* — Dentons US LLP

(57) ABSTRACT

An information input device including a touch panel configured to be provided with a touch sensor that detects a position at which a sensing object is brought close to a sensing surface. In this information input device, the touch sensor has a scanning electrode and a detecting electrode that is opposed to the scanning electrode with the intermediary of a dielectric substance, and is a capacitive sensor whose electrostatic capacitance changes if the sensing object is brought close to the detecting electrode. Furthermore, a slit is formed in a surface of the detecting electrode opposed to the scanning electrode.

10 Claims, 24 Drawing Sheets

Related U.S. Application Data continuation of application No. 12/759,260, filed on Apr. 13, 2010, now Pat. No. 9,092,095.

(51) Int. Cl.
  *G06F 3/044* (2006.01)
  *G09G 5/18* (2006.01)
  *G02F 1/1335* (2006.01)
  *G02F 1/1368* (2006.01)

(52) U.S. Cl.
  CPC .............. *G06F 3/0412* (2013.01); *G09G 5/18* (2013.01); *G02F 1/1368* (2013.01); *G02F 1/133528* (2013.01); *G02F 2203/01* (2013.01); *G06F 2203/04101* (2013.01); *G06F 2203/04103* (2013.01); *G06F 2203/04111* (2013.01); *G09G 2300/0426* (2013.01)

(56) References Cited

U.S. PATENT DOCUMENTS

| | | |
|---|---|---|
| 7,786,965 B2 | 8/2010 | Sasaki et al. |
| 7,821,506 B2 | 10/2010 | Sato et al. |
| 7,855,706 B2 | 12/2010 | Ozawa |
| 7,938,025 B2 | 5/2011 | Shimomoto et al. |
| 8,049,732 B2 | 11/2011 | Hotelling et al. |
| 8,228,312 B2 | 7/2012 | Matsubara |
| 8,792,062 B2 | 7/2014 | Hwang et al. |
| 8,816,970 B2 | 8/2014 | Wang et al. |
| 8,823,666 B2 | 9/2014 | Hong |
| 9,013,415 B2 | 4/2015 | Teranishi et al. |
| 9,036,094 B2 | 5/2015 | Ishizaki et al. |
| 9,063,628 B2 | 6/2015 | Watazu et al. |
| 9,146,412 B2 | 9/2015 | Abe et al. |
| 2001/0046004 A1 | 11/2001 | Ohe et al. |
| 2002/0008836 A1 | 1/2002 | Shibahara |
| 2006/0017710 A1 | 1/2006 | Lee et al. |
| 2006/0066799 A1 | 3/2006 | Mizusako et al. |
| 2006/0114397 A1 | 6/2006 | Mizusako et al. |
| 2007/0062739 A1 | 3/2007 | Philipp et al. |
| 2007/0121037 A1 | 5/2007 | Arai et al. |
| 2007/0177090 A1 | 8/2007 | Shimomaki |
| 2008/0053714 A1 | 3/2008 | Ito et al. |
| 2008/0062139 A1 | 3/2008 | Hotelling et al. |
| 2008/0129317 A1 | 6/2008 | Oba |
| 2008/0158443 A1 | 7/2008 | Shiomi |
| 2008/0211756 A1 | 9/2008 | Shiomi et al. |
| 2009/0096760 A1 | 4/2009 | Ma et al. |
| 2009/0109391 A1 | 4/2009 | Ito et al. |
| 2009/0231304 A1 | 9/2009 | Lee et al. |
| 2009/0284492 A1 | 11/2009 | Chino |
| 2010/0225612 A1 | 9/2010 | Ishizaki et al. |
| 2010/0238134 A1 | 9/2010 | Day et al. |
| 2010/0253642 A1 | 10/2010 | Tsuzaki et al. |
| 2010/0302203 A1 | 12/2010 | Tsuzaki et al. |
| 2010/0328268 A1 | 12/2010 | Teranishi et al. |
| 2011/0247884 A1 | 10/2011 | Kim et al. |
| 2013/0050108 A1 | 2/2013 | Hong |
| 2015/0169121 A1 | 6/2015 | Yao et al. |

FOREIGN PATENT DOCUMENTS

| | | |
|---|---|---|
| JP | 2007-086075 | 4/2007 |
| JP | 2008-009750 | 1/2008 |
| JP | 2008-129708 | 6/2008 |
| JP | 2008-300247 | 12/2008 |
| JP | 2009-003916 | 1/2009 |
| WO | 2004040361 | 5/2004 |

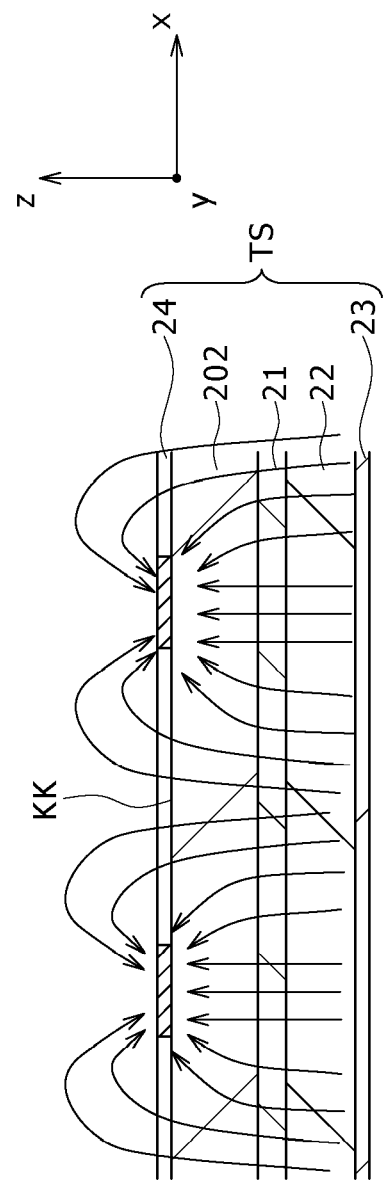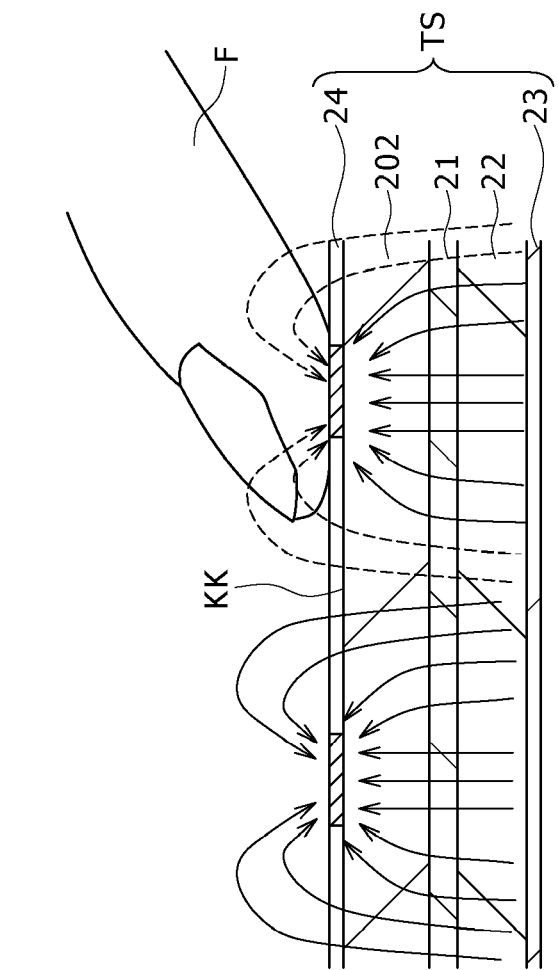

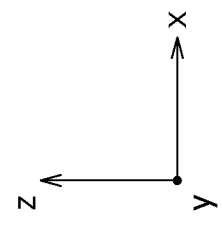
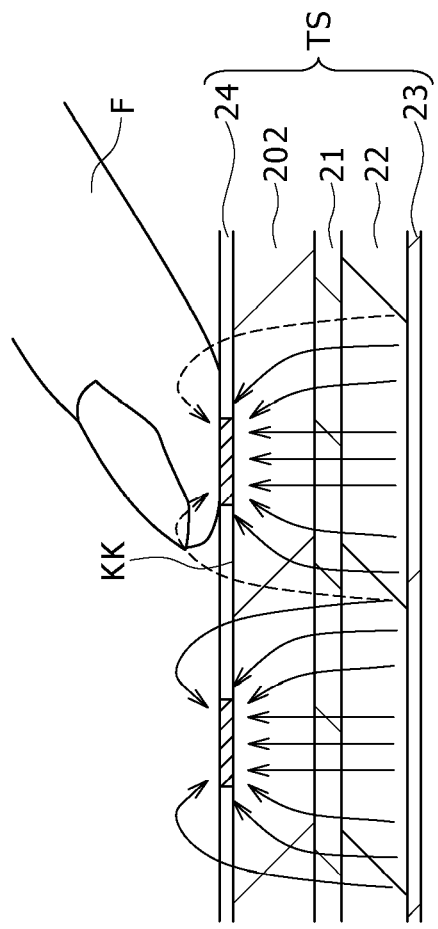
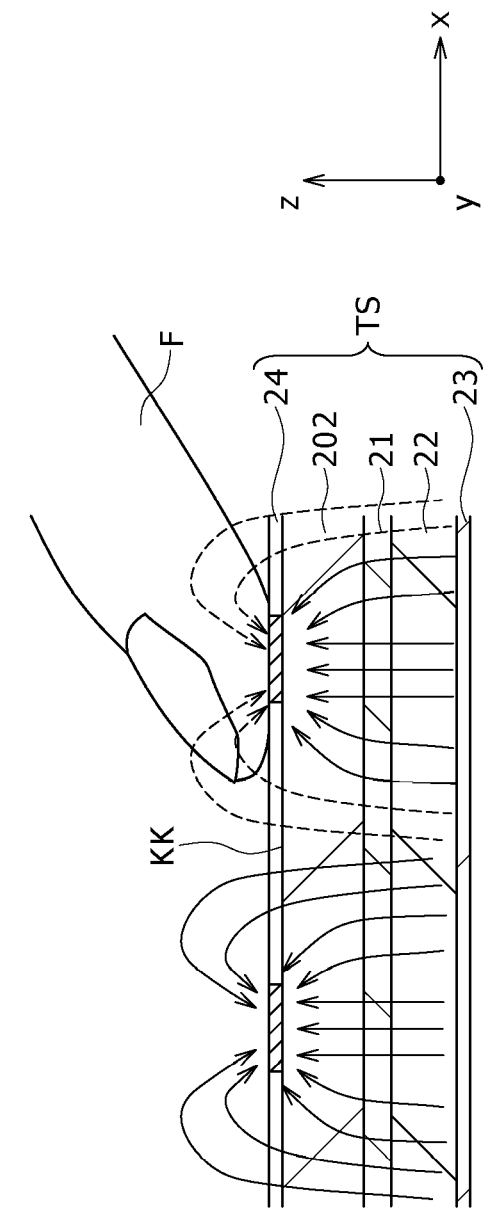
FIG.13A
FIG.13B

DISPLAY DEVICE WITH CAPACITIVE TOUCH SENSOR WITH SLIT FORMED IN A SURFACE OF A DETECTING ELECTRODE OPPOSED TO A SCANNING ELECTRODE TO REALIZE DETECTION WITH HIGH ACCURACY

RELATED APPLICATION DATA

This application is a continuation of U.S. patent application Ser. No. 14/743,547 filed Jun. 18, 2015, which is a continuation of U.S. patent application Ser. No. 12/759,260 filed Apr. 13, 2010, now U.S. Pat. No. 9,092,095 issued Jul. 28, 2015, the entireties of which are incorporated herein by reference to the extent permitted by law. The present application claims the benefit of priority to Japanese Patent Application No. JP 2009-102319 filed on Apr. 20, 2009 in the Japan Patent Office, the entirety of which is incorporated by reference herein to the extend permitted by law.

BACKGROUND OF THE INVENTION

1. Field of the Invention

The present invention relates to information input devices and display devices, and particularly to an information input device and a display device including a panel provided with a capacitive touch sensor for detecting the position to which an object to be sensed is brought close.

2. Description of the Related Art

Display devices such as liquid crystal display devices and organic EL display devices have advantages such as small thickness, light weight, and low power consumption. Therefore, these display devices are frequently used in mobile-use electronic apparatus such as cellular phones and digital cameras.

As one kind of such display devices, the liquid crystal display device has a liquid crystal panel formed by enclosing a liquid crystal layer between a pair of substrates as a display panel. The liquid crystal panel is e.g. a transmissive panel. Specifically, illuminating light emitted from an illuminating unit such as a backlight provided on the back side of the liquid crystal panel is modulated by the liquid crystal panel and passes through the liquid crystal panel. By the modulated illuminating light, image displaying is carried out on the front side of the liquid crystal panel.

This liquid crystal panel is based on e.g. the active-matrix system and includes a TFT array substrate over which plural thin film transistors (TFTs) functioning as pixel switching elements are formed. Furthermore, in this liquid crystal panel, a counter substrate is so disposed as to be opposed to this TFT array substrate and the liquid crystal layer is provided between the TFT array substrate and the counter substrate. In this liquid crystal panel of the active-matrix system, the pixel switching element inputs potential to a pixel electrode to thereby apply voltage to the liquid crystal layer and control the transmittance of the light passing through the pixel. Thereby, the image displaying is carried out.

For the above-described display device, a touch panel is often provided as an information input device on the display panel in order to allow the user to input operation data by utilizing images such as icons displayed on the screen of the display panel.

In addition to the display device in which the touch panel is provided as an external unit on the display panel, a display device in which the display panel has a built-in touch panel function has also been proposed.

For example, display panels provided with a capacitive touch sensor have been proposed (refer to e.g. Japanese Patent Laid-open Nos. 2008-9750, 2009-3916, and 2008-129708).

In these display panels, the capacitive touch sensor is so configured that the electrostatic capacitance changes when an object to be sensed (also referred to as a sensing object) is brought close to the sensing surface, and the position at which the sensing object is brought close to the sensing surface is detected based on the change in the electrostatic capacitance.

FIGS. 30A and 30B are diagrams showing the appearance when a capacitive touch sensor TS is driven. FIG. 30A shows the case in which a sensing object F is not brought close to the sensing surface of the touch sensor TS. On the other hand, FIG. 30B shows the case in which the sensing object F is brought close to the sensing surface.

As shown in FIGS. 30A and 30B, for the capacitive touch sensor TS, for example a pair of electrodes, i.e. a scanning electrode 23J and a detecting electrode 24J, are opposed to each other with the intermediary of a dielectric substance Y, so that the capacitive element is formed.

If the sensing object F is not brought close to the sensing surface, an electric field is generated between the scanning electrode 23J and the detecting electrode 24J as shown in FIG. 30A when a common potential Vcom is applied to the scanning electrode 23J, which serves as the drive electrode.

On the other hand, if the sensing object F having high electrostatic capacitance, such as a finger, is brought close to the sensing surface, as shown in FIG. 30B, the fringe electric field (the dotted-line part in the diagram) is blocked by the sensing object F.

Therefore, the electrostatic capacitance based on the scanning electrode 23J and the detecting electrode 24J varies depending on whether or not the sensing object F is present. Thus, based on the change in the electrostatic capacitance, the position at which the sensing object F is brought close to the sensing surface is detected.

However, in the case of the above-described capacitive touch sensor, its detection sensitivity is often not sufficiently high and thus it is often difficult to detect the touch position with high accuracy.

For example, if the electrostatic capacitance based on the scanning electrode and the detecting electrode is significantly lower than the parasitic capacitance of the detector, the detection is often not favorable, which causes the need to increase the width of the detecting electrode. However, in this case, the fringe electric field is blocked by this wide detecting electrode, and thus the lowering of the detection sensitivity often occurs.

Furthermore, if the detecting electrode is formed as a transparent electrode composed of ITO or the like, an attempt to ensure higher transparency of the detecting electrode raises the resistivity of the detecting electrode and thus causes increase in the time constant. This often results in a long detection time.

As above, the touch sensor often involves insufficient detection sensitivity and a long detection time, and therefore it is often difficult for the touch sensor to perform the detection with high accuracy.

There is a need for the present invention to provide a display device and an information input device that can easily realize detection with high accuracy.

SUMMARY OF THE INVENTION

According to an embodiment of the present invention, there is provided an information input device including a touch panel configured to be provided with a touch sensor that detects a position at which a sensing object is brought close to a sensing surface. In this information input device, the touch sensor has a scanning electrode and a detecting electrode that is opposed to the scanning electrode with the intermediary of a dielectric substance, and is a capacitive sensor whose electrostatic capacitance changes if the sensing object is brought close to the detecting electrode. Furthermore, a slit is formed in a surface of the detecting electrode opposed to the scanning electrode.

According to another embodiment of the present invention, there is provided a display device including a display panel configured to be provided with a touch sensor that detects a position to which a sensing object is brought close in a display surface for displaying an image. In this display device, the touch sensor has a scanning electrode and a detecting electrode that is opposed to the scanning electrode with the intermediary of a dielectric substance, and is a capacitive sensor whose electrostatic capacitance changes if the sensing object is brought close to the detecting electrode. Furthermore, a slit is formed in a surface of the detecting electrode opposed to the scanning electrode.

In the embodiments of the present invention, in the detecting electrode of the capacitive touch sensor, the slit is formed in the surface opposed to the scanning electrode. This allows generation of the fringe electric field via the slit.

The embodiments of the present invention can provide a display device and an information input device that can easily realize detection with high accuracy.

BRIEF DESCRIPTION OF THE DRAWINGS

FIGS. 12A and 12B are diagrams schematically showing the appearance when the touch sensor is driven in the first embodiment of the present invention;

FIGS. 13A and 13B are diagrams schematically showing the appearance when the touch sensor is driven in the first embodiment of the present invention;

DETAILED DESCRIPTION OF THE PREFERRED EMBODIMENTS

One example of embodiments of the present invention will be described below.

The description will be made in the following order.
1. First Embodiment
2. Second Embodiment
3. Third Embodiment
4. Fourth Embodiment
5. Fifth Embodiment
6. Others
<1. First Embodiment>
(A) Configuration of Display Device FIG. 1 is a diagram showing the outline of the configuration of a display device 100 in a first embodiment of the present invention.

Figure 1:
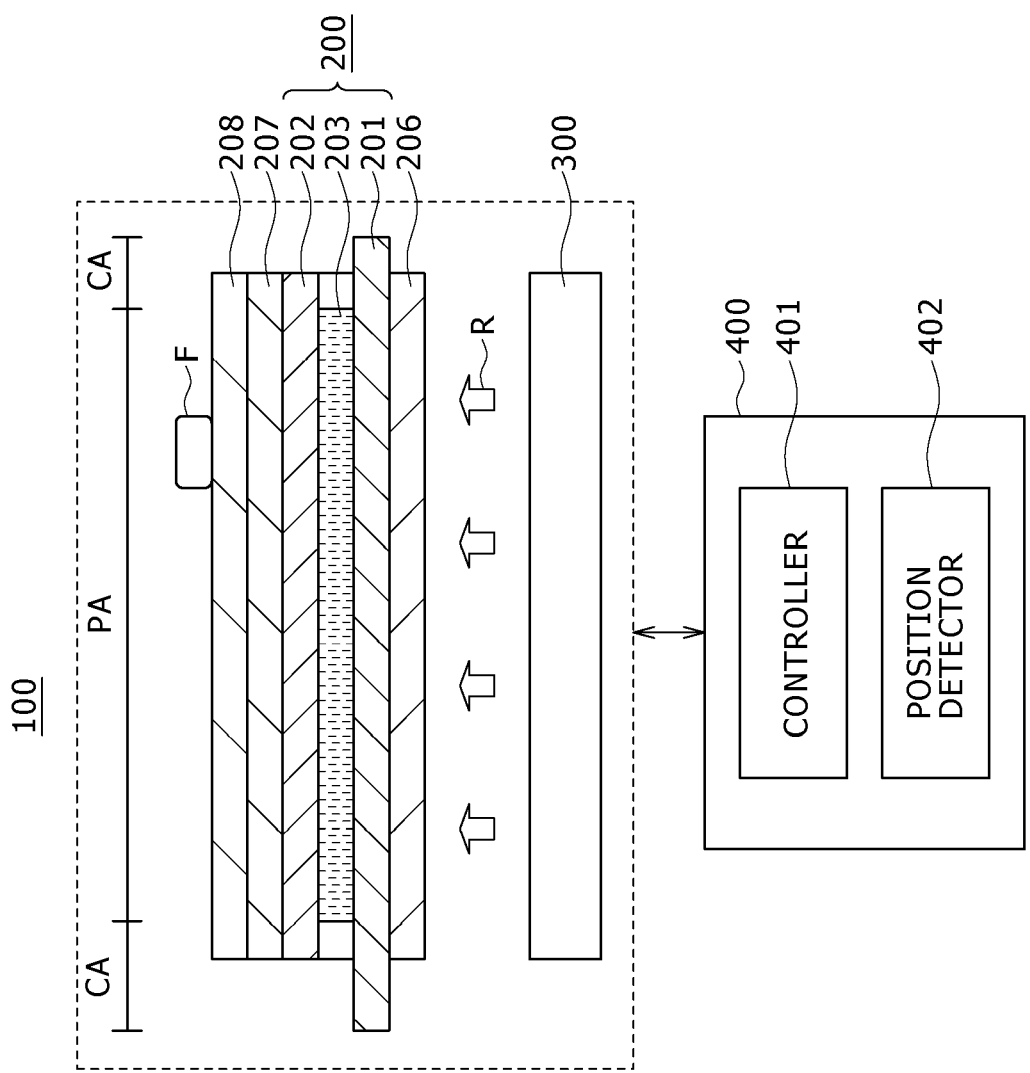
FIG. 1 is a diagram showing the outline of the configuration of a display device in a first embodiment of the present invention.

As shown in FIG. 1, the display device 100 of the present embodiment has a liquid crystal panel 200, a backlight 300, and a data processor 400. These respective units will be sequentially described below.

(A-1) Liquid Crystal Panel

The liquid crystal panel 200 is based on e.g. the active-matrix system and has a TFT array substrate 201, a counter substrate 202, and a liquid crystal layer 203 as shown in FIG. 1. In the liquid crystal panel 200, the TFT array substrate 201 and the counter substrate 202 are opposed to each other at an interval therebetween. The liquid crystal layer 203 is provided between these substrates.

For the liquid crystal panel 200, as shown in FIG. 1, a first polarizer 206 is disposed on the lower surface of the TFT array substrate 201 on the opposite side to the upper surface thereof opposed to the counter substrate 202. Furthermore, a second polarizer 207 is disposed on the upper surface of the counter substrate 202 on the opposite side to the lower surface thereof opposed to the TFT array substrate 201. In addition, a cover glass 208 is disposed on the upper surface of the second polarizer 207.

For the liquid crystal panel 200, as shown in FIG. 1, the backlight 300 is disposed below the TFT array substrate 201. The lower surface of the TFT array substrate 201 is irradiated with illuminating light R emitted from the backlight 300.

The liquid crystal panel 200 of the present embodiment is a transmissive panel. The illuminating light R passes through a display area PA, so that image displaying is carried out.

As described in detail later, plural pixels (not shown) are disposed in the display area PA. In this display area PA, the illuminating light R emitted from the backlight 300 provided on the back surface side of the liquid crystal panel 200 is received by the back surface via the first polarizer 206, and the illuminating light R received by the back surface is modulated. Over the TFT array substrate 201, plural TFTs are provided as pixel switching elements (not shown) corresponding to the plural pixels. Through control of the pixel switching elements, the illuminating light R received by the back surface is modulated. The modulated illuminating light R is output to the front surface side via the second polarizer 207, so that an image is displayed in the display area PA. For example, a color image is displayed on the front surface side of the liquid crystal panel 200.

In addition, in the present embodiment, this liquid crystal panel 200 includes touch sensors (not shown) of the "capacitive type." The touch sensor is so configured as to output a signal of a different potential depending on the position at which a sensing object F such as a finger of the user is brought into contact with the front surface of the liquid crystal panel 200 on the opposite side to the back surface side, at which the backlight 300 is provided. That is, the liquid crystal panel 200 functions not only as a display panel but also as a touch panel. This feature allows the display device 100, which is a liquid crystal display device, to function as an information input device.

(A-2) Backlight

The backlight 300 is opposed to the back surface of the liquid crystal panel 200 and emits the illuminating light R to the display area PA of the liquid crystal panel 200 as shown in FIG. 1.

Specifically, the backlight 300 is located below the TFT array substrate 201, and emits the illuminating light R to the surface of the TFT array substrate 201 on the opposite side to the surface thereof opposed to the counter substrate 202. That is, the backlight 300 emits the illuminating light R in such a way that the illuminating light R is directed from the side of the TFT array substrate 201 toward the side of the counter substrate 202. In this configuration, the backlight 300 emits the illuminating light R along the normal direction z of the surface of the liquid crystal panel 200.

(A-3) Data Processor

The data processor 400 has a controller 401 and a position detector 402 as shown in FIG. 1. The data processor 400 includes a computer and is so configured that the computer operates as the controller 401 and the position detector 402 based on a program.

In the data processor 400, the controller 401 is so configured as to control the operation of the liquid crystal panel 200 and the backlight 300. The controller 401 supplies a control signal to the liquid crystal panel 200 to thereby control the operation of the plural pixel switching elements (not shown) provided in the liquid crystal panel 200. For example, the controller 401 makes the liquid crystal panel 200 carry out line-sequential driving. Furthermore, the controller 401 supplies a control signal to the backlight 300 to thereby control the operation of the backlight 300 and make the backlight 300 emit the illuminating light R. In this manner, the controller 401 controls the operation of the liquid crystal panel 200 and the backlight 300 to thereby display an image in the display area PA of the liquid crystal panel 200.

In addition, the controller 401 supplies a control signal to the liquid crystal panel 200 to thereby control the operation of the touch sensors provided in the liquid crystal panel 200 and collect detection data from the touch sensors.

The position detector 402 in the data processor 400 is so configured as to detect the coordinate position at which the sensing object F such as a finger of a human body is brought close to the display area PA on the front surface (display surface) side of the liquid crystal panel 200. In the present embodiment, the position detector 402 carries out the detection of the coordinate position based on the detection data obtained by the touch sensors provided in the liquid crystal panel 200.

(B) Entire Configuration of Liquid Crystal Panel

The entire configuration of the liquid crystal panel 200 will be described below.

Figure 2:
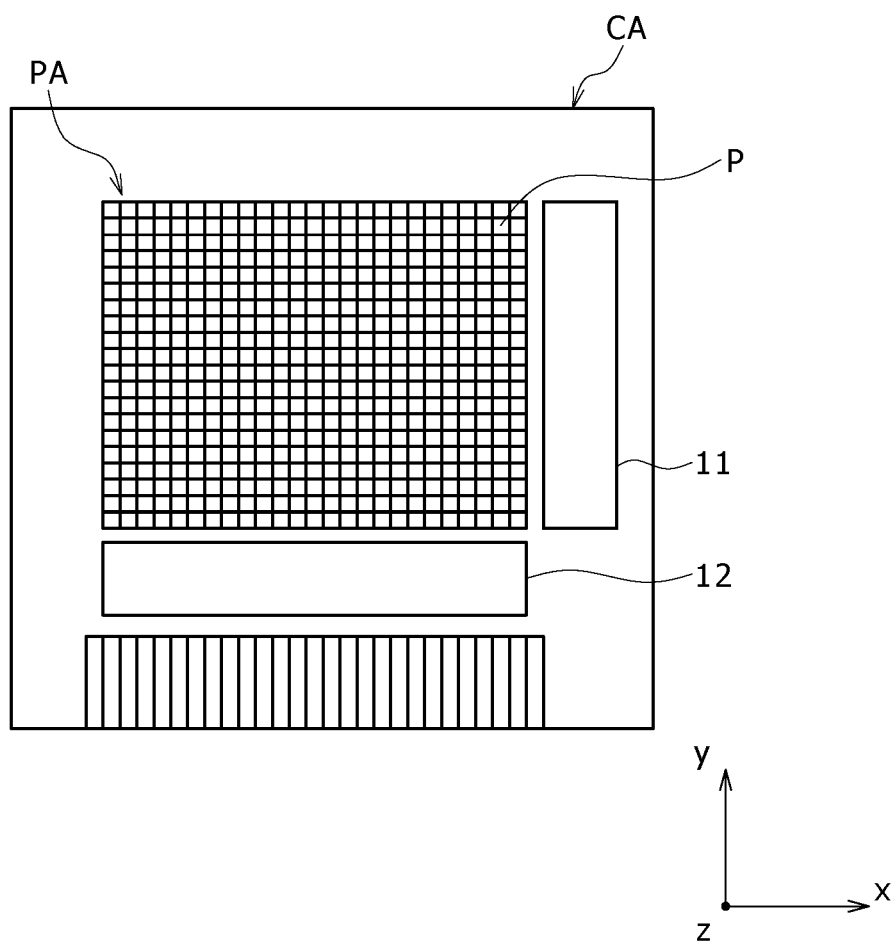
FIG. 2 is a diagram showing the entire configuration of a liquid crystal panel in the first embodiment of the present invention.

FIG. 2 is a diagram showing the entire configuration of the liquid crystal panel 200 in the first embodiment of the present invention. FIG. 2 is a plan view of the liquid crystal panel 200.

As shown in FIG. 2, the liquid crystal panel 200 has the display area PA and a peripheral area CA.

In the liquid crystal panel 200, plural pixels P are disposed in the display area PA along the surface as shown in FIG. 2. Specifically, in the display area PA, the plural pixels P are arranged in a matrix along each of the horizontal direction x and the vertical direction y, and images are displayed therein.

As described in detail later, the pixels P each include the above-described pixel switching element (not shown). Furthermore, the plural touch sensors (not shown) are so provided as to correspond to the plural pixels P.

In the liquid crystal panel 200, the peripheral area CA is so located as to surround the display area PA as shown in FIG. 2. In this peripheral area CA, a vertical drive circuit 11 and a horizontal drive circuit 12 are formed as shown in FIG. 2. These respective circuits are formed by using e.g. semiconductor elements formed similarly to the above-described pixel switching elements (not shown).

The vertical drive circuit 11 and the horizontal drive circuit 12 drive the pixel switching elements provided corresponding to the pixels P to thereby carry out image displaying in the display area PA.

In addition, the vertical drive circuit 11 is so configured as to drive the touch sensors (not shown) provided in the display area PA, and a detector (not shown) is provided in the peripheral area CA so as to detect the detection data obtained by driving of the touch sensors. Based on the detection data acquired from the touch sensors, the position detector 402 detects the position at which a sensing object such as a finger of the user is brought into contact with the display area PA of the liquid crystal panel 200.

(C) Detailed Configuration of Liquid Crystal Panel

The detailed configuration of the liquid crystal panel 200 will be described below.

Figure 3:
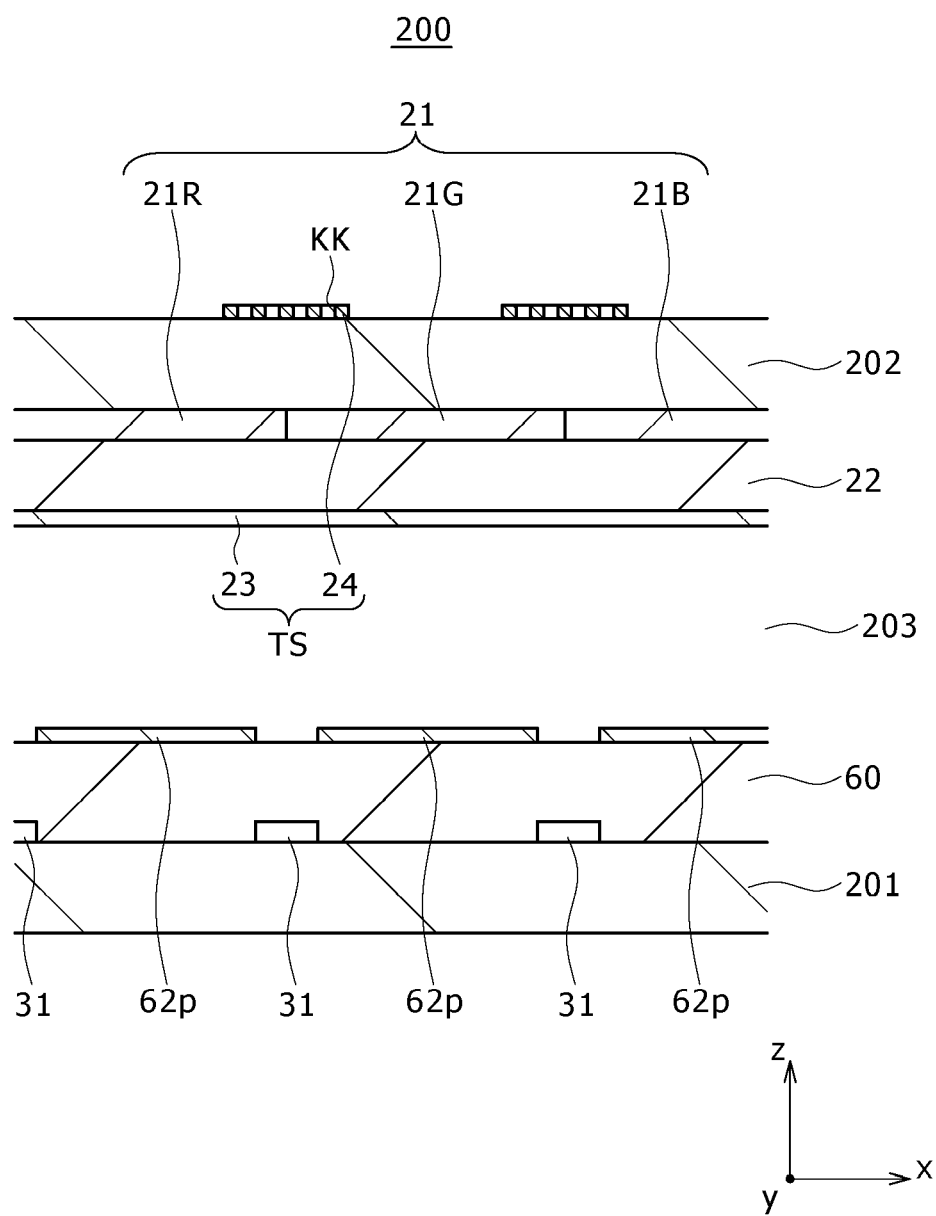
FIG. 3 is a diagram showing the detailed configuration of the liquid crystal panel in the first embodiment of the present invention.
Figure 4:
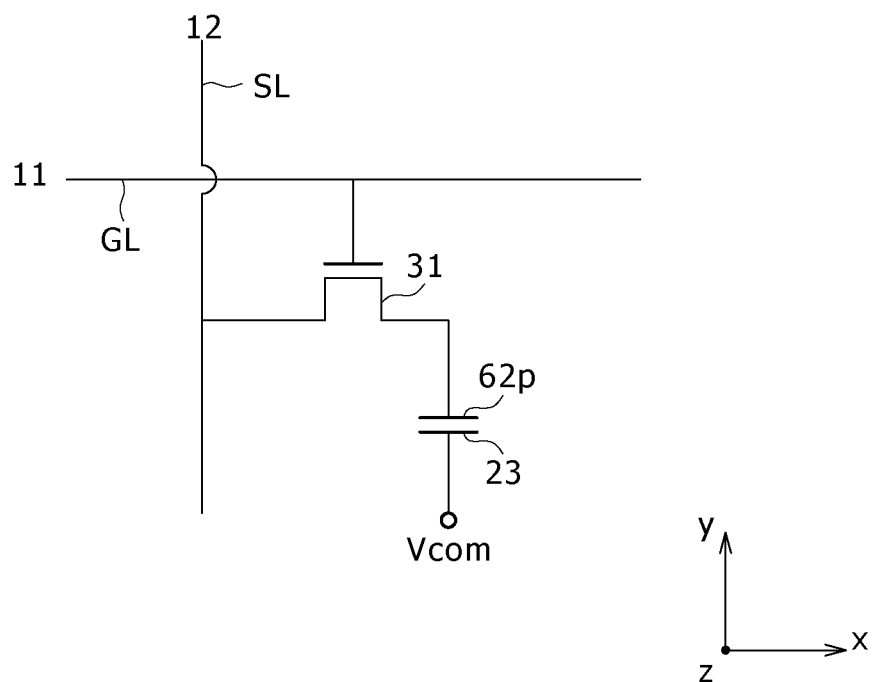
FIG. 4 is a diagram showing the detailed configuration of the liquid crystal panel in the first embodiment of the present invention.
Figure 5:
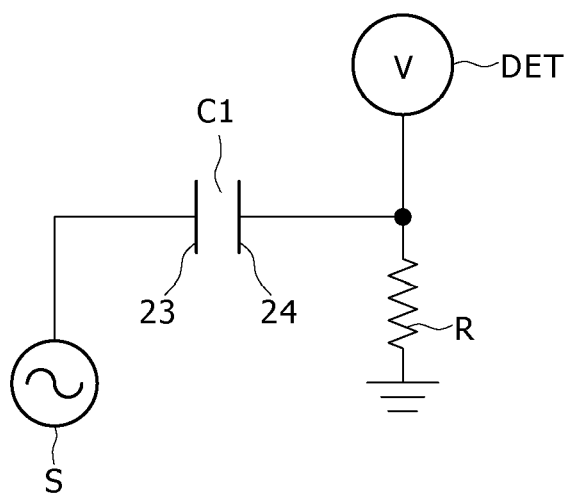
FIG. 5 is a diagram showing the detailed configuration of the liquid crystal panel in the first embodiment of the present invention.

FIG. 3, FIG. 4, and FIG. 5 are diagrams showing the detailed configuration of the liquid crystal panel 200 in the first embodiment of the present invention.

FIG. 3 is a sectional view schematically showing the outline of the pixels P. FIG. 4 is a circuit diagram showing the outline of the pixel P. FIG. 5 is a circuit diagram showing the outline of a touch sensor TS.

The liquid crystal panel 200 has the TFT array substrate 201 and the counter substrate 202 as shown in FIG. 3. Spacers (not shown) are interposed between the TFT array substrate 201 and the counter substrate 202 and these substrates are bonded to each other by a sealing material (not shown). The liquid crystal layer 203 is enclosed between the TFT array substrate 201 and the counter substrate 202.

Furthermore, in the present embodiment, the touch sensors TS are provided in the liquid crystal panel 200 as shown in FIG. 3. Therefore, the liquid crystal panel 200 is so configured as to function not only as a display panel but also as a touch panel.

The touch sensor TS includes a capacitive element C1 formed by a counter electrode 23 and a detecting electrode 24 as shown in FIG. 5, and is so configured that the electrostatic capacitance of the capacitive element C1 changes when a sensing object (not shown) is brought close to the detecting electrode 24.

The respective components of the liquid crystal panel 200 will be described below.

(C-1) TFT Array Substrate

Details of the TFT array substrate 201 included in the liquid crystal panel 200 will be described below.

The TFT array substrate 201 is a substrate composed of an optically-transparent insulator and is formed of e.g. glass. As shown in FIG. 3, pixel switching elements 31 and pixel electrodes 62p are formed over the TFT array substrate 201.

The respective components provided over the TFT array substrate 201 will be described below.

As shown in FIG. 3, the pixel switching elements 31 are provided on the surface of the TFT array substrate 201 opposed to the counter substrate 202. The pixel switching element 31 is e.g. a bottom-gate TFT formed by using poly-silicon.

In the TFT serving as the pixel switching element 31, the gate electrode is electrically connected to a gate line GL as shown in FIG. 4.

As shown in FIG. 4, the gate line GL extends along the x direction. Although not shown in FIG. 3, the gate line GL is formed monolithically with the gate electrode of the pixel switching element 31 on the surface of the TFT array substrate 201 shown in FIG. 3. For example, the gate line GL is formed by using a metal material such as molybdenum and forms a light-blocking area that does not transmit light but blocks light in the liquid crystal panel 200.

Furthermore, as shown in FIG. 4, the gate line GL is electrically connected to the vertical drive circuit 11. To the gate electrode of the pixel switching element 31, a scan signal Vgate is supplied from the vertical drive circuit 11 via the gate line GL.

One source/drain region of the TFT serving as the pixel switching element 31 is electrically connected to a signal line SL as shown in FIG. 4.

As shown in FIG. 4, the signal line SL is so formed as to extend along the y direction and is electrically connected to the horizontal drive circuit 12. The signal line SL outputs, to the pixel switching element 31, a video data signal input from the horizontal drive circuit 12.

The signal line SL is provided in an interlayer insulating film 60 that is so formed on the TFT array substrate 201 as to cover the pixel switching elements 31 although not shown in FIG. 3. The signal line SL is formed by using e.g. an electrically-conductive material that blocks light. Specifically, the signal line SL is formed by using a metal material and forms a light-blocking area that does not transmit light but blocks light in the liquid crystal panel 200.

On the other hand, the other source/drain region of the pixel switching element 31 is electrically connected to the pixel electrode 62p as shown in FIG. 4.

As shown in FIG. 3, the pixel electrodes 62p are provided over the surface of the TFT array substrate 201 opposed to the counter substrate 202 with the intermediary of the interlayer insulating film 60. The pixel electrode 62p is a so-called transparent electrode and is formed by using e.g. ITO.

As shown in FIG. 4, the pixel electrode 62p is electrically connected to the pixel switching element 31, and receives the video data signal input from the horizontal drive circuit 12 to apply voltage to the liquid crystal layer 203 when the pixel switching element 31 is set to the on-state. Thereby, the alignment direction of the liquid crystal molecules included in the liquid crystal layer 203 changes and the light passing through the liquid crystal layer 203 is modulated, so that image displaying is carried out.

(C-2) Counter Substrate 202

The counter substrate 202 included in the liquid crystal panel 200 will be described below.

The counter substrate 202 is a substrate composed of an optically-transparent insulator similarly to the TFT array substrate 201, and is formed of e.g. glass. As shown in FIG. 3, this counter substrate 202 is opposed to the TFT array substrate 201 at an interval therebetween. Around the counter substrate 202, a color filter layer 21, the counter electrodes 23, and the detecting electrodes 24 are formed.

The respective components provided around the counter substrate 202 will be described below.

As shown in FIG. 3, the color filter layer 21 is formed on the surface of the counter substrate 202 opposed to the TFT array substrate 201. The color filter layer 21 includes a red filter 21R, a green filter 21G, and a blue filter 21B, and the respective filters are so formed as to be arranged along the x direction. That is, in the color filter layer 21, the filters of three primary colors, i.e. red, green, and blue, are treated as one set, and the filters of the respective colors are provided for each pixel P. The color filter layer 21 is formed by using e.g. a polyimide resin in which colorants such as pigments or dyes are contained corresponding to the respective colors. White light emitted from the backlight 300 is colored by the color filter layer 21 and then output therefrom.

As shown in FIG. 3, a planarizing film 22 covers the surface of the color filter layer 21 opposed to the TFT array substrate 201. This planarizing film 22 is formed by using an optically-transparent insulating material and planarizes the side of the surface of the counter substrate 202 opposed to the TFT array substrate 201.

As shown in FIG. 3, the counter electrodes 23 are formed over the surface of the counter substrate 202 opposed to the TFT array substrate 201. The counter electrodes 23 are so formed as to cover the planarizing film 22. The counter electrode 23 is a transparent electrode that transmits visible light and is formed by using e.g. ITO.

As shown in FIG. 3, the counter electrodes 23 are so formed that the liquid crystal layer 203 is sandwiched between the counter electrodes 23 and the pixel electrodes 62p, and are so configured as to function as a common electrode that applies voltage to the liquid crystal layer 203 sandwiched between the counter electrodes 23 and the pixel electrodes 62p.

In addition, in the present embodiment, the counter electrode 23 is so provided that a dielectric substance (in FIG. 3, the counter substrate 202 and so on) is sandwiched between the counter electrode 23 and the detecting electrode 24 and thereby the capacitive element C1 is formed as shown in FIG. 3 and FIG. 5. That is, the counter electrode 23 is so provided as to form the capacitive touch sensor TS together with the detecting electrode 24. As shown in FIG. 5, the counter electrode 23 is electrically connected to a sensor driver S, and a drive signal Sg output from the sensor driver S is input to the counter electrode 23.

Figure 6:
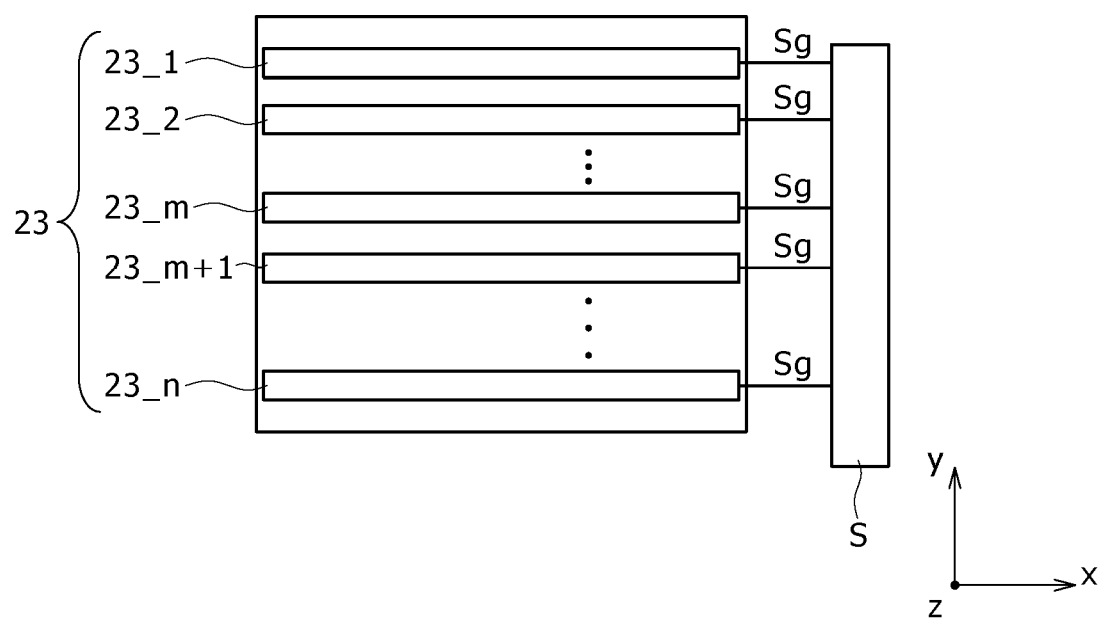
FIG. 6 is a diagram showing the detailed configuration of counter electrodes in the first embodiment of the present invention.

FIG. 6 is a diagram showing the detailed configuration of the counter electrodes 23 in the first embodiment of the present invention. FIG. 6 is a top view of the counter electrodes 23.

As shown in FIG. 6, the counter electrodes 23 are in a stripe manner and extend along the horizontal direction x over the surface of the counter substrate 202. Furthermore, the counter electrodes 23 are so disposed that plural electrodes are arranged at intervals in the vertical direction y. Specifically, n electrodes, i.e. first to n-th counter electrodes 23_1 to 23_n, are provided as the counter electrodes 23 in the direction from the upper side toward the lower side. In this configuration, the plural counter electrodes 23 are disposed with an equivalent interval in such a manner as to be opposed to each of the plural pixel electrodes 62p arranged along the vertical direction y.

Each of the first to n-th counter electrodes 23_1 to 23_n is electrically connected to the sensor driver S as shown in FIG. 6. Each of the first to n-th counter electrodes 23_1 to 23_n is sequentially selected to be supplied with the drive signal Sg output from the sensor driver S. That is, each of the first to n-th counter electrodes 23_1 to 23_n is supplied with the drive signal Sg based on line-sequential scan driving.

The detecting electrodes 24 are formed on the surface of the counter substrate 202 on the opposite side to the surface thereof opposed to the TFT array substrate 201 as shown in FIG. 3. The detecting electrode 24 is a transparent electrode that transmits visible light and is formed by using e.g. ITO.

As shown in FIG. 3 and FIG. 5, the detecting electrode 24 and the counter electrode 23 sandwich a dielectric substance (in FIG. 3, the counter substrate 202 and so on), and form the capacitive touch sensor TS. Furthermore, as shown in FIG. 5, the detecting electrode 24 is electrically connected to a detector DET and grounded via a resistor R. The detecting electrode 24 is so configured as to output a detection signal Vdet to the detector DET.

As described in detail later, if a sensing object as a conductive body having high capacity, such as a finger, is brought close to the detecting electrode 24, the fringe electric field by the counter electrode 23 to which the drive signal Sg is input is blocked by the sensing object. Thus, the capacitance changes depending on whether or not the sensing object is present, and the potential of the detecting electrode 24 changes. Therefore, the contact position can be detected by detecting this potential change via the detector DET.

Figure 7:
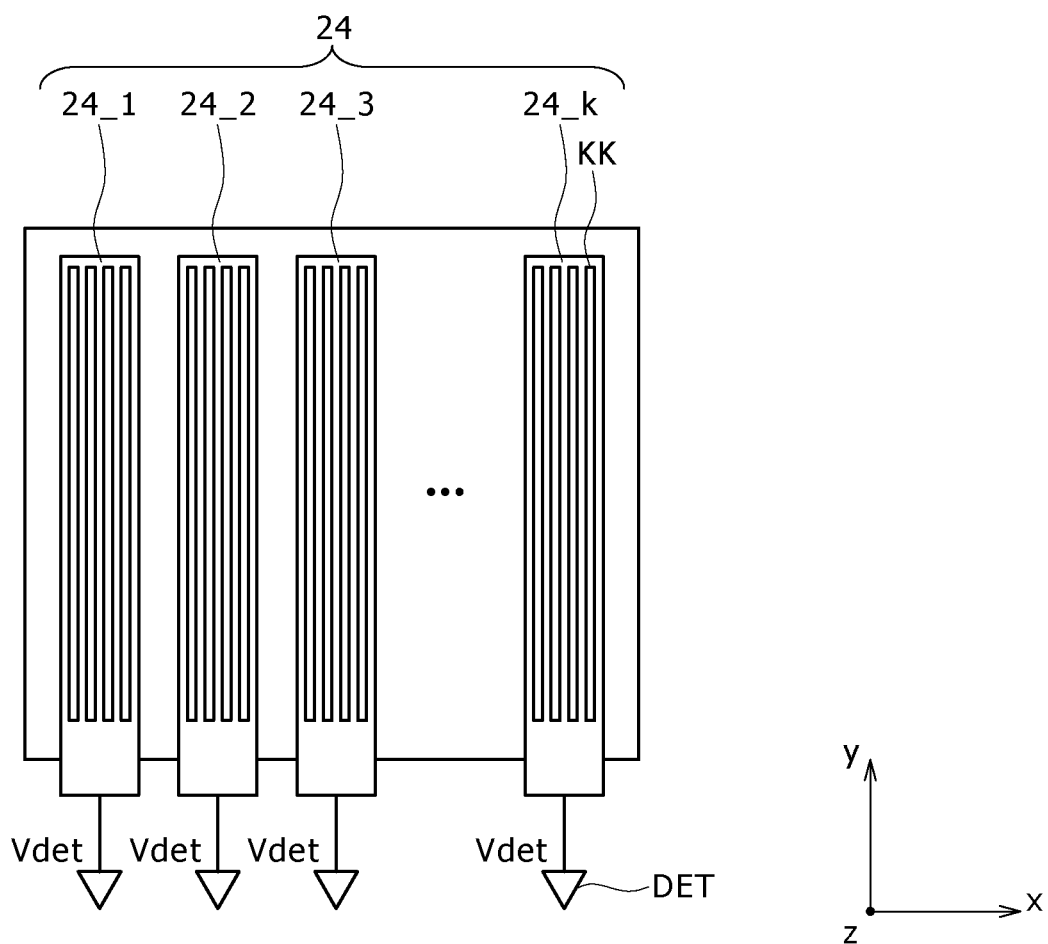
FIG. 7 is a diagram showing the detailed configuration of detecting electrodes in the first embodiment of the present invention.

FIG. 7 is a diagram showing the detailed configuration of the detecting electrodes 24 in the first embodiment of the present invention. FIG. 7 is a top view of the detecting electrodes 24.

As shown in FIG. 7, the detecting electrodes 24 are in a stripe manner and extend along the vertical direction y on the surface of the counter substrate 202. Furthermore, the detecting electrodes 24 are so disposed that plural electrodes are arranged at intervals in the horizontal direction x. Specifically, k electrodes, i.e. first to k-th detecting electrodes 24_1 to 24_k, are provided as the detecting electrodes 24 in the direction from the left side toward the right side.

Each of the first to k-th detecting electrodes 24_1 to 24_k is electrically connected to the detector DET as shown in FIG. 7. As described in detail later, each of the first to k-th detecting electrodes 24_1 to 24_k outputs the detection signal Vdet to the detector DET.

In the present embodiment, as shown in FIG. 7, slits KK are formed in the surface of each of the detecting electrodes 24 opposed to the counter electrodes 23. The slits KK extend along the vertical direction y inside each detecting electrode 24 and are so provided that plural slits are arranged at intervals in the horizontal direction x. For example, it is preferable that the width of the slit KK be 100 to 1100 μm.

(C-3) Liquid Crystal Layer 203

The liquid crystal layer 203 included in the liquid crystal panel 200 will be described below.

The liquid crystal layer 203 is sandwiched between the TFT array substrate 201 and the counter substrate 202 opposed to each other as shown in FIG. 3.

In this configuration, the liquid crystal molecules (not shown) in the liquid crystal layer 203 are aligned by a liquid crystal alignment film (not shown) formed over the TFT array substrate 201 and a liquid crystal alignment film (not shown) formed over the counter substrate 202. For example, the liquid crystal layer 203 is so formed that the liquid crystal molecules are vertically aligned. The liquid crystal layer 203 is so configured that the alignment direction of the liquid crystal molecules changes due to voltage application by the pixel electrode 62p and the counter electrode 23. The liquid crystal layer 203 may be so formed as to conform to the TN (Twisted Nematic) mode or the ECB (Electrically Controlled Birefringence) mode, besides the VA (Vertical Alignment) mode.

(C-4) Sensor Driver S

The detailed configuration of the sensor driver S electrically connected to the counter electrodes 23 will be described below.

Figure 8:
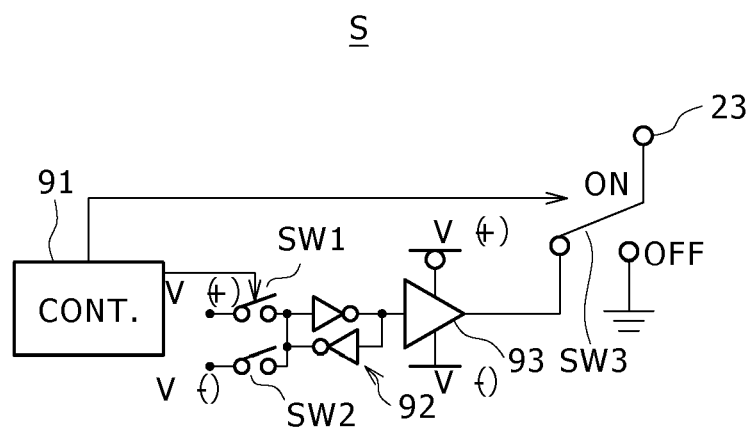
FIG. 8 is a diagram showing the detailed configuration of a sensor driver in the first embodiment of the present invention.

FIG. 8 is a diagram showing the detailed configuration of the sensor driver S in the first embodiment of the present invention.

As shown in FIG. 8, the sensor driver S has a controller 91, a first switch SW1, a second switch SW2, a latch circuit 92, a buffer circuit 93, and a third switch SW3, and is so configured as to function as an AC current source. The sensor driver S applies, to the counter electrode 23, the drive signal Sg that is e.g. an AC rectangular wave with a frequency of several kilohertz to several tens of kilohertz and is a common potential Vcom.

The respective components included in the sensor driver S will be sequentially described below.

In the sensor driver S, the controller 91 is formed as a circuit that controls the switching operation of each of the first switch SW1, the second switch SW2, and the third switch SW3 as shown in FIG. 8.

In the sensor driver S, one terminal of the first switch SW1 is electrically connected to the latch circuit 92 as shown in FIG. 8. The first switch SW1 is so configured that a positive voltage V (+) is applied to the latch circuit 92 when the first switch SW1 is set to the on-state by the switching control by the controller 91.

In the sensor driver S, one terminal of the second switch SW2 is electrically connected to the latch circuit 92 as shown in FIG. 8. The second switch SW2 is so configured that a negative voltage V (−) is applied to the latch circuit 92 when the second switch SW2 is set to the on-state by the control by the controller 91.

In the sensor driver S, the input terminal of the latch circuit 92 is electrically connected to each of the first switch SW1 and the second switch SW2. The output terminal of the latch circuit 92 is electrically connected to the third switch SW3 via the buffer circuit 93.

In the sensor driver S, the buffer circuit 93 is a waveform shaping unit and is provided as a circuit that carries out potential compensation of the input potential for the positive voltage V (+) and the negative voltage V (−) and outputs the resulting voltage.

In the sensor driver S, the switching operation of the third semiconductor SW3 is controlled by the controller 91. The third switch SW3 is electrically connected to the counter electrode 23 when being set to the on-state. On the other hand, the third switch SW3 becomes the inactive GND-connected state when being set to the off-state.

The sensor driver S having this configuration is so provided as to correspond to each of the plural counter electrodes 23.

The above-described sensor driver S is included in the vertical drive circuit 11 (see FIG. 2) in the peripheral area CA located around the display area PA on the TFT array substrate 201 for example. Alternatively, it may be provided in the peripheral area CA on the counter substrate 202.

(C-5) Detector DET

The detailed configuration of the detector DET electrically connected to the detecting electrode 24 will be described below.

Figure 9:
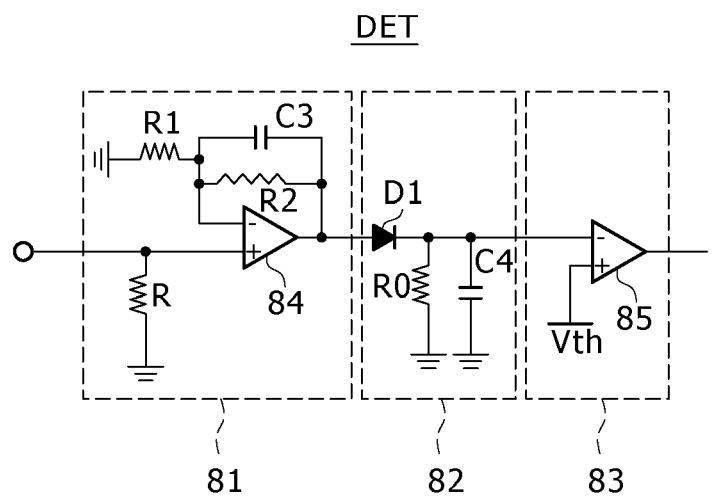
FIG. 9 is a circuit diagram showing a detector in the first embodiment of the present invention.

FIG. 9 is a circuit diagram showing the detector DET in the first embodiment of the present invention.

As shown in FIG. 9, the detector DET includes an OP-Amp circuit 81, a rectifier circuit 82, and an output circuit 83.

The respective components included in the detector DET will be sequentially described below.

In the detector DET, the OP-Amp circuit 81 includes an OP-Amp 84, resistors R, R1, and R2, and a capacitor C3 as shown in FIG. 9, and is so configured as to function as a filter circuit in addition to a signal amplifying circuit. Specifically, the OP-Amp circuit 81 amplifies the detection signal Vdet output from the detecting electrode 24, and then removes a predetermined frequency component from the detection signal Vdet to output the resulting signal to the rectifier circuit 82.

More specifically, as shown in FIG. 9, in the OP-Amp circuit 81, the detecting electrode 24 is electrically connected to the positive input terminal (+) of the OP-Amp 84, and the detection signal Vdet output from the detecting electrode 24 is input to the positive input terminal (+). In this configuration, the detecting electrode 24 is connected to the ground potential via the resistor R in order to electrically fix the DC level of the potential. The resistor R2 and the capacitor C3 are connected in parallel between the negative input terminal (−) of the OP-Amp 84 and the output terminal thereof, and the resistor R1 is connected between the negative input terminal (−) of the OP-Amp 84 and the ground potential.

In the detector DET, the rectifier circuit 82 has a diode D1, a charging capacitor C4, and a discharging resistor R0 as shown in FIG. 9. This rectifier circuit 82 is so configured that the signal output from the OP-Amp circuit 81 is half-wave rectified by the diode D1 and then the signal is smoothed by the smoothing circuit composed of the charging capacitor C4 and the discharging resistor R0 to be output to the output circuit 83.

Specifically, in the rectifier circuit 82, the anode of the diode D1 is electrically connected to the output terminal of the OP-Amp circuit 81 as shown in FIG. 9. Each of the charging capacitor C4 and the discharging resistor R0 is electrically connected between the cathode of the diode D1 and the ground potential.

In the detector DET, the output circuit 83 includes a comparator 85 as shown in FIG. 9, and is so configured as to function as an AD converter that converts the analog signal output from the rectifier circuit 82 to a digital signal.

Specifically, as shown in FIG. 9, the negative input terminal (−) of the comparator 85 is electrically connected to the rectifier circuit 82. Furthermore, a threshold voltage Vth is input to the positive input terminal (+) of the comparator 85. The comparator 85 executes processing of comparison between the analog signal output from the rectifier circuit 82 and the threshold voltage Vth, and outputs the digital signal based on the result of the processing.

The above-described detector DET is provided in the peripheral area CA located around the display area PA on the counter substrate 202 for example. Alternatively, it may be provided in the peripheral area CA on the TFT array substrate 201.

(D) Operation

The operation of the above-described display device 100 will be described below.

The operation at the time of image displaying in the above-described display device 100 will be described.

In the image displaying, the controller 401 controls the operation of the liquid crystal panel 200 (see FIG. 1). Furthermore, the controller 401 supplies a control signal to the backlight 300 to thereby control the operation of the backlight 300 and make the backlight 300 emit the illuminating light R (see FIG. 1).

In this case, the controller 401 supplies a control signal to the liquid crystal panel 200 to thereby drive the plural pixels P provided in the liquid crystal panel 200 (see FIG. 2). In this configuration, the vertical drive circuit 11 and the horizontal drive circuit 12 drive the plural pixels P disposed in the display area PA.

Specifically, the vertical drive circuit 11 supplies a drive signal to the gates of the pixel switching elements 31 via the gate line GL and turns the pixel switching elements 31 to the on-state (see FIG. 4).

In addition, the vertical drive circuit 11 supplies the drive signal Sg to each of the plural counter electrodes 23. In this configuration, the vertical drive circuit 11 line-sequentially selects the plural counter electrodes 23 arranged in the vertical direction y and supplies the drive signal Sg to the selected counter electrodes 23. Specifically, each of the first to n-th counter electrodes 23_1 to 23_$n$ is supplied with the drive signal Sg based on line-sequential scan driving and set to the common potential Vcom. That is, the vertical drive circuit 11 functions as the above-described sensor driver S (see FIG. 8 and so on).

Furthermore, at this time, the horizontal drive circuit 12 supplies video signals from the signal lines SL to the pixel electrodes 62p via the pixel switching elements 31.

Thus, an electric field is applied to the liquid crystal layer 203 between the pixel electrodes 62p and the counter electrodes 23 and the alignment of the liquid crystal molecules in the liquid crystal layer 203 changes, so that the light passing through the liquid crystal layer 203 is modulated. Consequently, image displaying is carried out in the display area PA.

The above-described image displaying operation is carried out based on the Vcom inversion driving system.

A description will be made below about operation at the time of detection of the position at which the sensing object F such as a finger of the user is brought into contact with the display area PA of the liquid crystal panel 200 in the above-described display device 100.

Figure 10A:
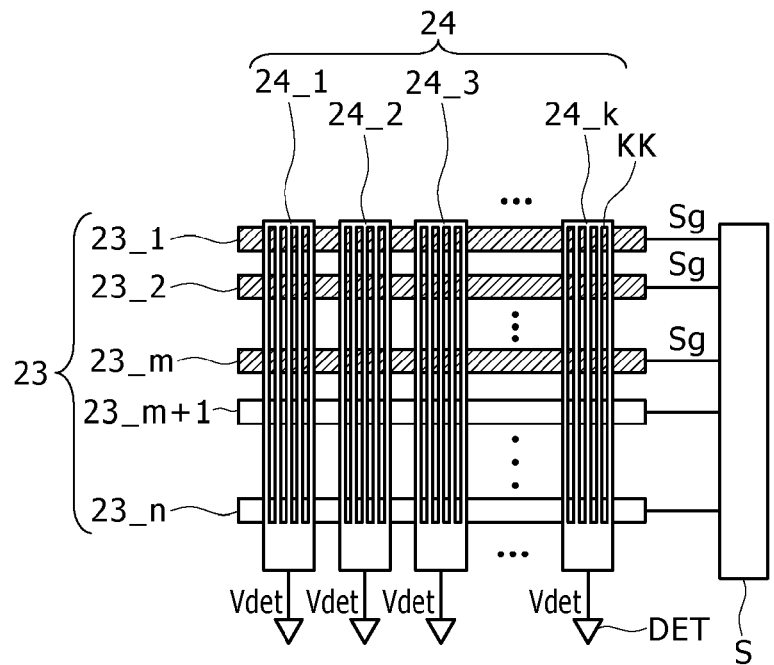
FIGS. 10A and 10B are diagrams for explaining the operation of touch sensors in the first embodiment of the present invention.
Figure 10B:
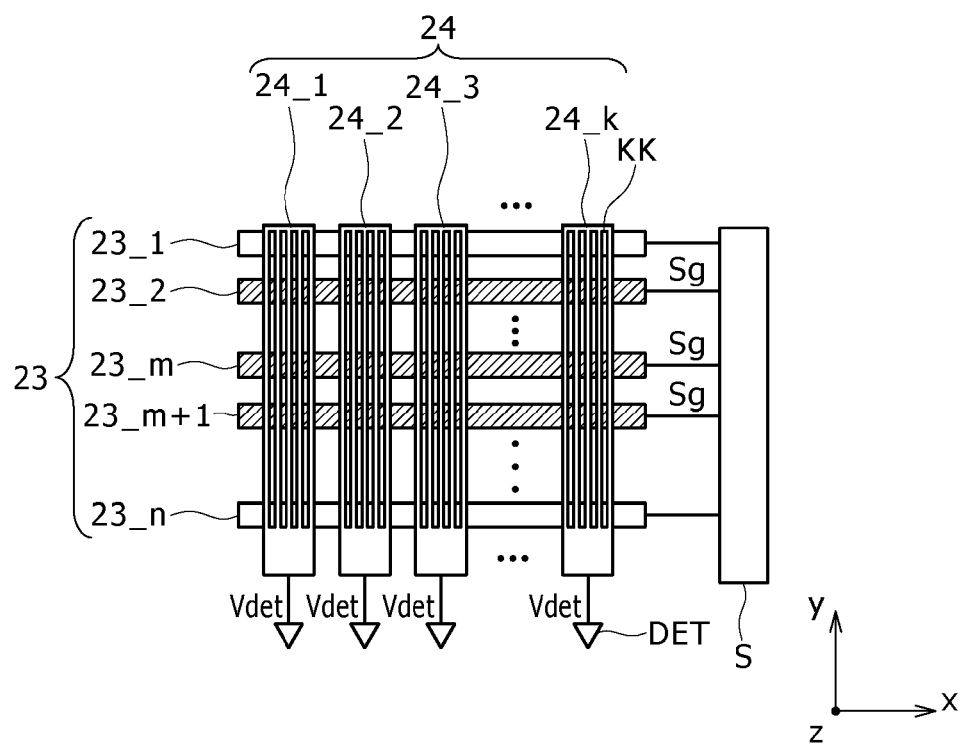

FIGS. 10A and 10B are diagrams for explaining the operation of the touch sensors TS in the first embodiment of the present invention. FIGS. 10A and 10B are top views showing the counter electrodes 23 and the detecting electrodes 24. In FIGS. 10A and 10B, of the plural counter electrodes 23, the counter electrodes 23 that are supplied with the drive signal Sg by the vertical drive circuit 11 and set to the common potential Vcom in the above-described image displaying operation are represented as hatched areas.

In the above-described image displaying operation, some of the plural counter electrodes 23 are selected and supplied with the drive signal Sg as shown by the hatched areas in FIGS. 10A and 10B.

In the present embodiment, as shown in FIGS. 10A and 10B, m counter electrodes (23_1 to m, 23_2 to m+1, ...) of n counter electrodes 23_1 to n (m<n) are selected and supplied with the drive signal Sg. That is, m counter electrodes 23 are simultaneously set to the common potential Vcom.

m counter electrodes 23 as the selected electrodes are shifted in the vertical direction y and the above-described supply of the drive signal Sg is carried out.

For example, as shown by the hatched areas in FIG. 10A, the counter electrodes 23 from the first counter electrode 23_1 to the m-th counter electrode 23_m are selected. Furthermore, the drive signal Sg is supplied to these selected counter electrodes 23 from the first counter electrode 23_1 to the m-th counter electrode 23_m.

Subsequently, as shown by the hatched areas in FIG. 10B, the counter electrodes 23 from the second counter electrode 23_2 to the (m+1)-th counter electrode 23_m+1 are selected. Furthermore, the drive signal Sg is supplied to these selected counter electrodes 23 from the second counter electrode 23_2 to the (m+1)-th counter electrode 23_m+1.

In this manner, in the image displaying operation, consecutive m counter electrodes 23 of n counter electrodes 23 (m<n) are selected and the Vcom inversion driving (AC driving) is carried out. Furthermore, the shift operation of changing these selected electrodes in the vertical direction y is so carried out that at least one counter electrode 23 is common between before and after each shift operation. The Vcom inversion driving is carried out for m counter electrodes 23 selected through the shift operation.

When the counter electrodes 23 are supplied with the drive signal Sg and set to the common potential Vcom in the above-described manner, a charge is accumulated in the capacitive elements at the intersections of these counter electrodes 23 and the detecting electrodes 24 as shown in FIGS. 10A and 10B. Furthermore, when the shift operation is carried out in the above-described manner, charging and discharging are carried out at the capacitive elements at the intersections of the counter electrodes 23 and the detecting electrodes 24. In this configuration, the rows of the capacitive elements as the targets of the charging and discharging are line-sequentially moved in linkage with the scanning by the drive signal Sg. Thus, the detection signal Vdet with the signal intensity dependent on the capacitance of the capacitive element is output from each of the detecting electrodes 24 to a respective one of the detectors DET.

Based on the detection signals Vdet output from the detectors DET, the position detector 402 in the data processor 400 (see FIG. 1) performs position detection.

Figures 11A, 11B:
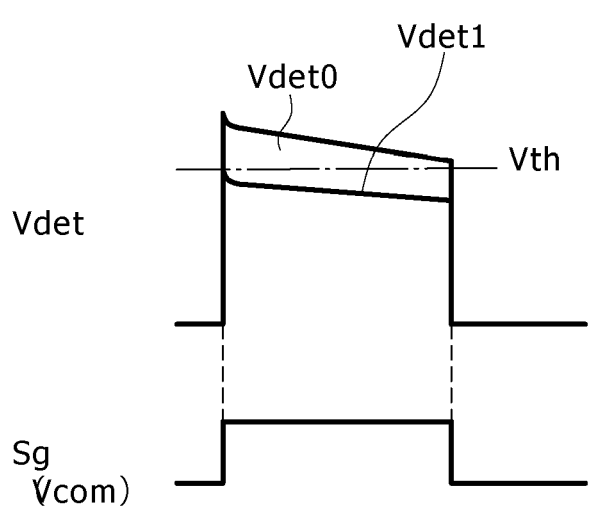
FIGS. 11A and 11B are waveform diagrams respectively showing a detection signal and a drive signal in the first embodiment of the present invention.

FIGS. 11A and 11B are waveform diagrams showing the drive signal Sg and the detection signal Vdet in the first embodiment of the present invention.

As shown in FIGS. 11A and 11B, when the drive signal Sg as a rectangular wave is output to the counter electrode 23, the detection signal Vdet is output from the detecting electrode 24.

If a sensing object is not brought close to the detecting electrode 24, a detection signal Vdet0 is output with signal intensity higher than the threshold Vth as shown in FIG. 11A. In this case, each of the detection signals Vdet0 output from the plural detecting electrodes 24 has almost constant signal intensity.

Figure 30A:
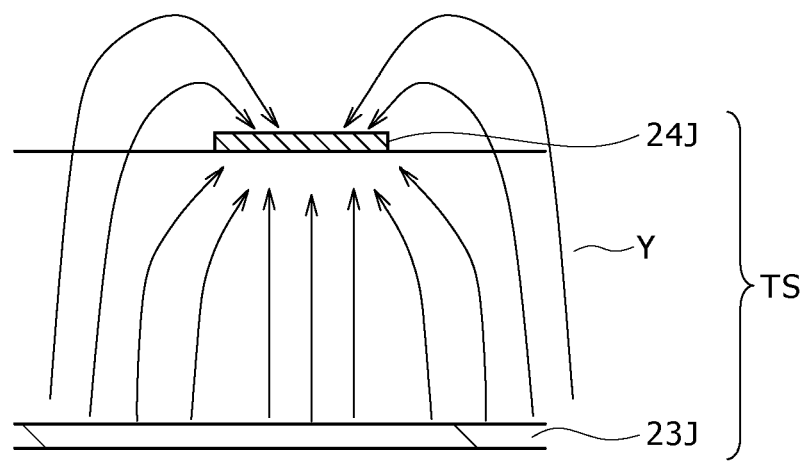
FIGS. 30A and 30B are diagrams showing the appearance when a capacitive touch sensor is driven.
Figure 30B:
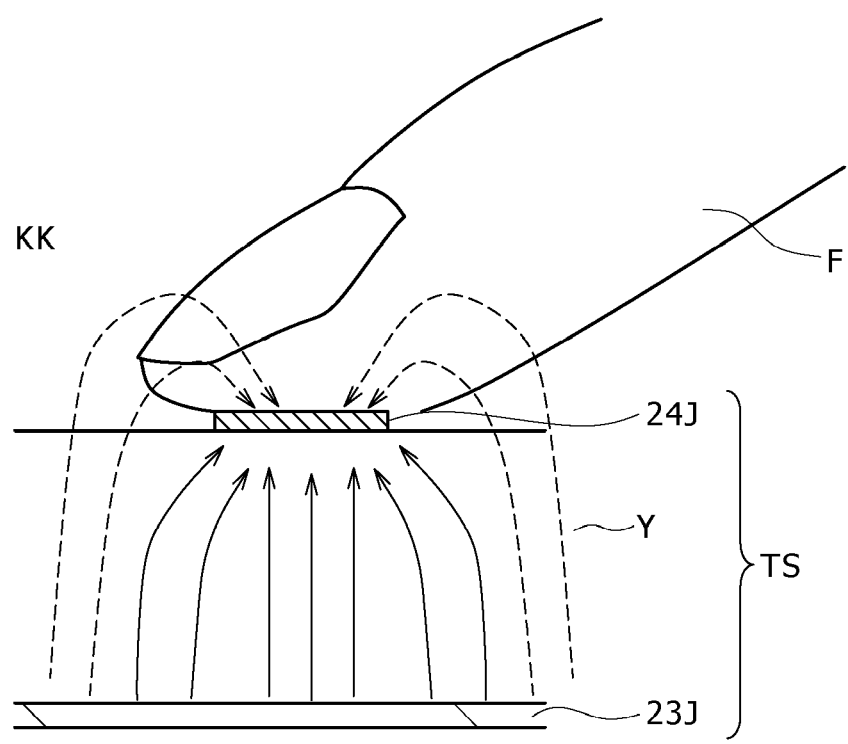

On the other hand, if a sensing object having high electrostatic capacitance, such as a finger, is brought close to the detecting electrode 24, the fringe electric field (see FIG. 30B) is blocked by the sensing object. Thus, the electrostatic capacitance based on the counter electrode 23 and the detecting electrode 24 varies depending on whether or not the sensing object is present. Therefore, a detection signal Vdet1 with signal intensity lower than the above-described threshold Vth is output as shown in FIG. 11A. Consequently, the signal intensity of each of the detection signals Vdet output from the plural detecting electrodes 24 varies depending on whether or not the sensing object is present, and thus the position at which the sensing object F is brought close to the sensing surface is detected. In this configuration, the touch position coordinates can be obtained based on the timing of the application of the drive signal Sg and the timing of the detection by the detectors DET.

By making the touch sensor TS operate in the above-described manner, the lowering of the sensor voltage and the lowering of the image quality due to the switching of the electrode driving can be prevented.

FIGS. 12A and 12B are diagrams schematically showing the appearance when the touch sensor TS is driven in the first embodiment of the present invention. FIG. 12A shows the case in which the sensing object F is not brought close to the sensing surface of the touch sensor TS. On the other hand, FIG. 12B shows the case in which the sensing object F is brought close to the sensing surface.

As shown in FIGS. 12A and 12B, the slit KK is formed in the surface of the detecting electrode 24 opposed to the counter electrode 23.

As shown in FIG. 12A, if the sensing object F is not brought close to the sensing surface (display surface), an electric field is generated between the counter electrode 23 and the detecting electrode 24 when the common potential Vcom is applied to the counter electrode 23. In the present embodiment, the fringe electric field via the slit KK provided in the detecting electrode 24 is also generated in addition to the electric field between the flat plates of the counter electrode 23 and the detecting electrode 24.

If the sensing object F such as a finger is brought close to the sensing surface (display surface), as shown in FIG. 12B, the fringe electric field (the dotted-line part in the diagram) is blocked by this sensing object F. In the present embodiment, the fringe electric field via the slit KK provided in the detecting electrode 24 is also blocked and thus not generated.

Consequently, the change in the electrostatic capacitance dependent on whether or not the sensing object F is present is larger when the slit KK is provided in the detecting electrode 24 than when the slit KK is not provided.

Thus, in the present embodiment, the detection sensitivity of the touch sensor TS can be enhanced by providing the slit KK in the detecting electrode 24. Furthermore, by keeping the total value of the width of the part of the detecting electrode 24 other than the part in which the slit KK is provided, the resistance can be kept even when the width of the whole of the detecting electrode 24 becomes larger. This can prevent increase in the time constant in the detecting electrode 24. Therefore, extension of the detection time can be prevented.

It is preferable for the slit KK to have a larger slit width.

FIGS. 13A and 13B are diagrams schematically showing the appearance when the touch sensor TS is driven in the first embodiment of the present invention. FIG. 13A shows the case in which the slit width is small. On the other hand, FIG. 13B shows the case in which the slit width is large.

As shown in FIG. 13A, if the slit width of the slit KK is small, only the fringe electric field attributed to the near part of the counter electrode 23 is generated.

On the other hand, as shown in FIG. 13B, if the slit width of the slit KK is large, not only the fringe electric field attributed to the near part of the counter electrode 23 but also the fringe electric field attributed to the farther part is generated.

Therefore, when the slit width of the slit KK is large, the ratio of the fringe electric field blocked by the sensing object F when the sensing object F is brought into contact with the detecting electrode 24 is higher than when the slit width is small, and thus higher detection sensitivity can be achieved.

For example, when the width of the slit KK provided on the counter substrate was set to 200 μm, 300 μm, 500 μm, and 1100 μm under simulation conditions shown below, the detection sensitivity was about 8%, about 10%, about 11%, and about 14%, respectively, and thus larger slit width was more preferable. This "sensitivity" refers to the ratio of the amount of change in the output voltage due to finger placement with respect to the amount of change in the output voltage obtained when the finger is absent, and the ratio is represented as the percentage.

the thickness of the counter substrate (color filter substrate): 300 μm
the relative dielectric constant of the counter substrate (color filter substrate): 4
the thickness of the polarizer (on the counter substrate): 125 μm
the relative dielectric constant of the polarizer: 5

The sensitivity is higher when the width of the whole of the detecting electrode (the width of the whole including the slit), whose maximum value is equivalent to the finger size, is larger. The reason for this is that the contact area with the finger is increased, and the optimum width of the detecting electrode is e.g. about 4 to 8 mm, which is equivalent to the finger size.

(E) Summary

As above, in the display device 100 of the present embodiment, the capacitive touch sensors TS for detecting the position to which the sensing object F is brought close are provided in the display surface for image displaying in the liquid crystal panel 200 (see FIG. 3). This touch sensor TS has the counter electrode 23 and the detecting electrode 24, and the detecting electrode 24 is opposed to the counter electrode 23 with the intermediary of a dielectric substance. The electrostatic capacitance changes when the sensing object F is brought close to the detecting electrode 24. Furthermore, the slit KK is formed in the surface of the detecting electrode 24 opposed to the counter electrode 23.

Thus, as described above, the touch sensor TS of the present embodiment can achieve larger change as the change in the electrostatic capacitance dependent on whether or not the sensing object F is present, compared with the case in which the slit KK is not provided in the detecting electrode 24.

Therefore, the present embodiment can enhance the detection sensitivity of the touch sensor and can carry out detection of the touch position of the sensing object F with high accuracy.

Furthermore, in the present embodiment, the plural counter electrodes 23 function as scanning electrodes opposed to the plural detecting electrodes 24 with the intermediary of the dielectric substance in the touch sensors TS. In addition, the plural counter electrodes 23 function as common electrodes opposed to the plural pixel electrodes 62p with the intermediary of the liquid crystal layer 203 in the pixels P for image displaying. Because of this feature, the detection signal of the touch sensor TS can be obtained by using the common drive signal Vcom for the image displaying also as the drive signal for the touch sensor. That is, the counter electrode 23 is so configured as to be used as both the common electrode for applying voltage to the liquid crystal layer 203 for the image displaying and the scanning electrode included in the touch sensor TS. Moreover, because a touch panel is not separately provided as an external unit, small thickness can be obtained as the thickness of the entire device.

Thus, the present embodiment allows smaller thickness of the device and can realize enhancement in the manufacturing efficiency and cost reduction.

<2. Second Embodiment>

A second embodiment of the present invention will be described below.

(A) Detailed Configuration of Liquid Crystal Panel

The detailed configuration of a liquid crystal panel 200b in the present embodiment will be described.

Figure 14:
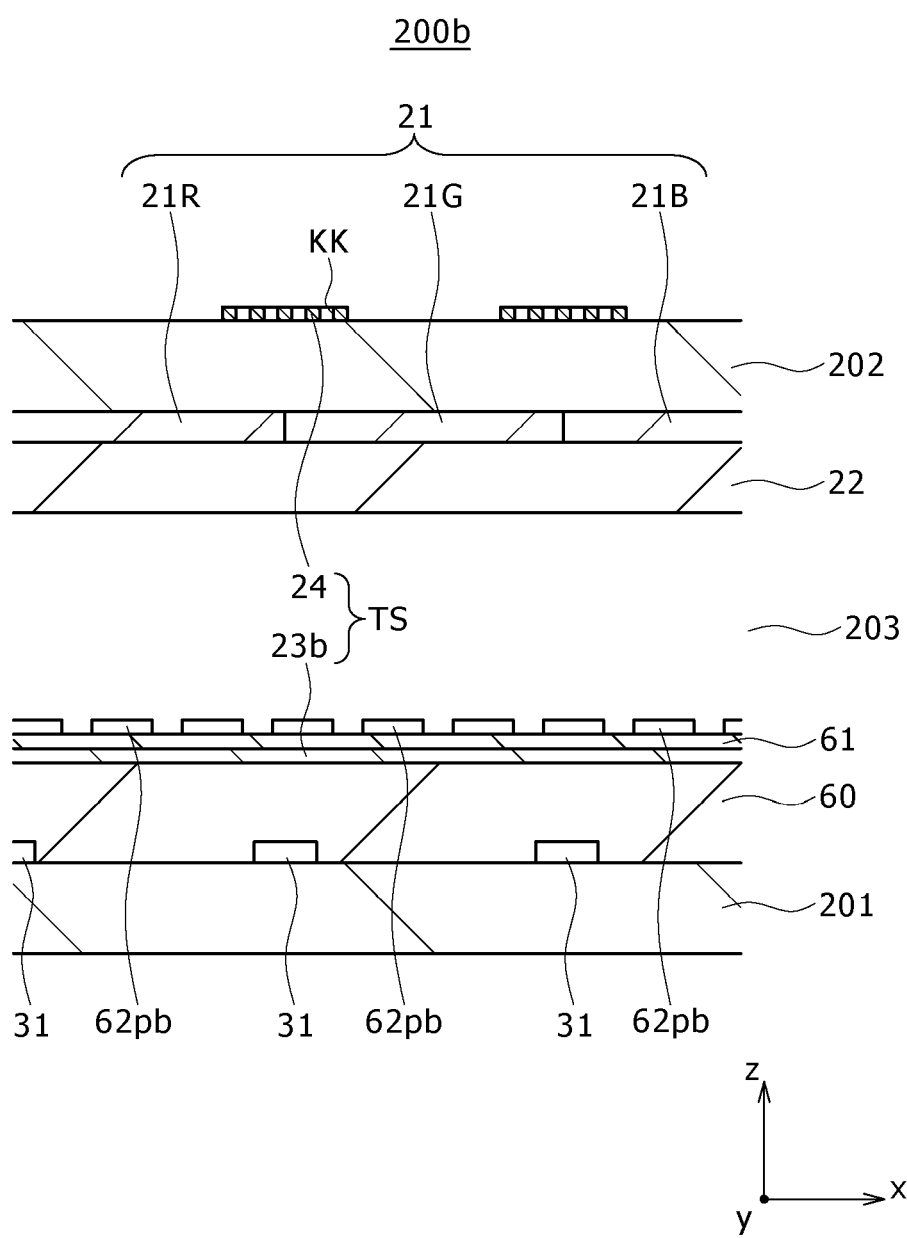
FIG. 14 is a diagram showing a major part of a liquid crystal panel in a second embodiment of the present invention.
Figure 15:
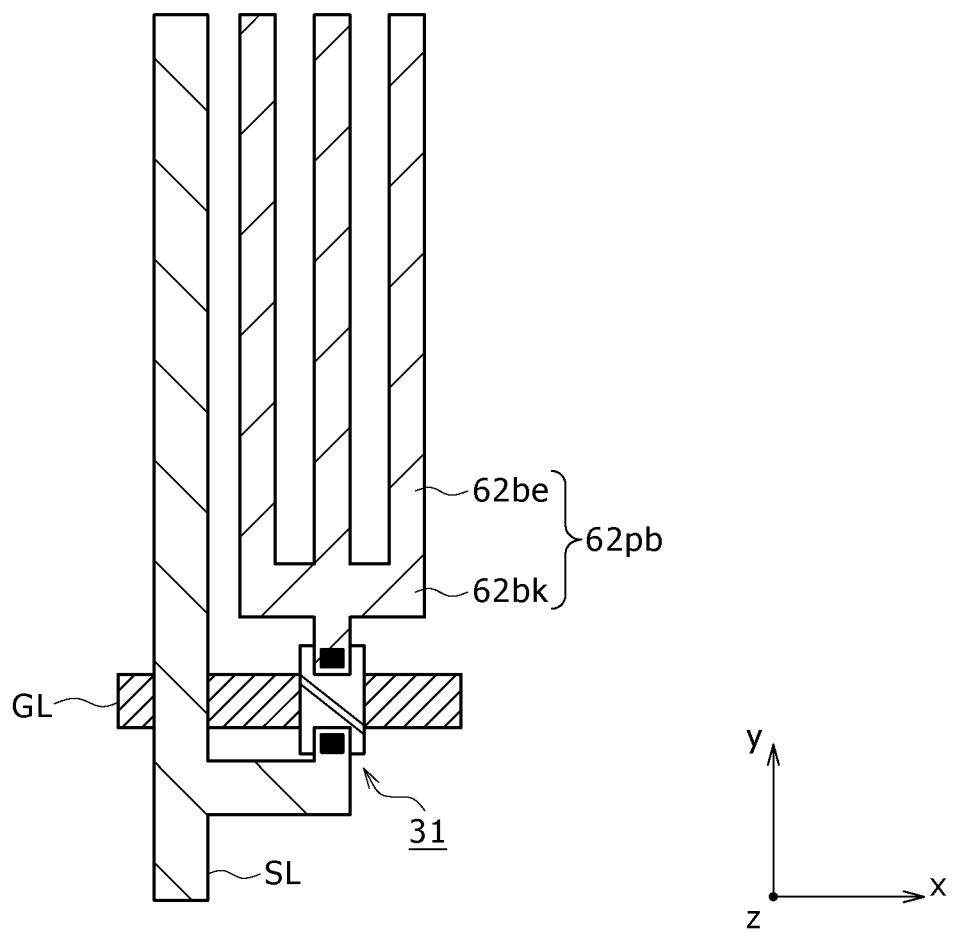
FIG. 15 is a diagram showing a major part of the liquid crystal panel in the second embodiment of the present invention.

FIG. 14 and FIG. 15 are diagrams showing major parts of the liquid crystal panel 200b in the second embodiment of the present invention.

FIG. 14 is a sectional view schematically showing the outline of pixels P provided in a display area PA in the liquid crystal panel 200b according to the second embodiment of the present invention.

FIG. 15 is a top view schematically showing the outline of the pixel P provided in the display area PA in the liquid crystal panel 200b according to the second embodiment of the present invention.

As shown in FIG. 14 and FIG. 15, in the liquid crystal panel 200b of the present embodiment, pixel electrodes 62pb and counter electrodes 23b are so formed as to conform to the fringe field switching (FFS) system. Except for this point and points relating thereto, the second embodiment is the same as the first embodiment. Therefore, description of the overlapping part is omitted.

The pixel electrodes 62*pb* are formed over the surface of a TFT array substrate 201 opposed to a counter substrate 202 as shown in FIG. 14.

Specifically, the pixel electrodes 62*pb* are provided on an interlayer insulating film 61 that is formed by using an insulating material in such a manner as to cover the counter electrodes 23*b* over the TFT array substrate 201 as shown in FIG. 14. For example, they are provided on the interlayer insulating film 61 formed as a silicon nitride film.

In the present embodiment, because the liquid crystal panel 200*b* is based on the FFS system, the pixel electrode 62*pb* is so pattern-processed as to have a comb tooth shape in the xy plane as shown in FIG. 15.

Specifically, the pixel electrode 62*pb* has a backbone part 62*bk* and branch parts 62*be* as shown in FIG. 15.

In the pixel electrode 62*pb*, the backbone part 62*bk* extends along the x direction as shown in FIG. 15.

Furthermore, in the pixel electrode 62*pb*, the branch parts 62*be* are connected to the backbone part 62*bk* and extend along the y direction as shown in FIG. 15. The branch parts 62*be* are so disposed that plural parts are arranged at intervals in the x direction as shown in FIG. 15. Furthermore, both ends of each of the plural parts are connected to the backbone part 62*bk*, and the plural parts are so arranged as to extend in parallel to each other.

The counter electrodes 23*b* are formed over the surface of the TFT array substrate 201 opposed to the counter substrate 202 as shown in FIG. 14. Specifically, the counter electrodes 23*b* are provided under the interlayer insulating film 61 formed over the TFT array substrate 201.

Figure 16:
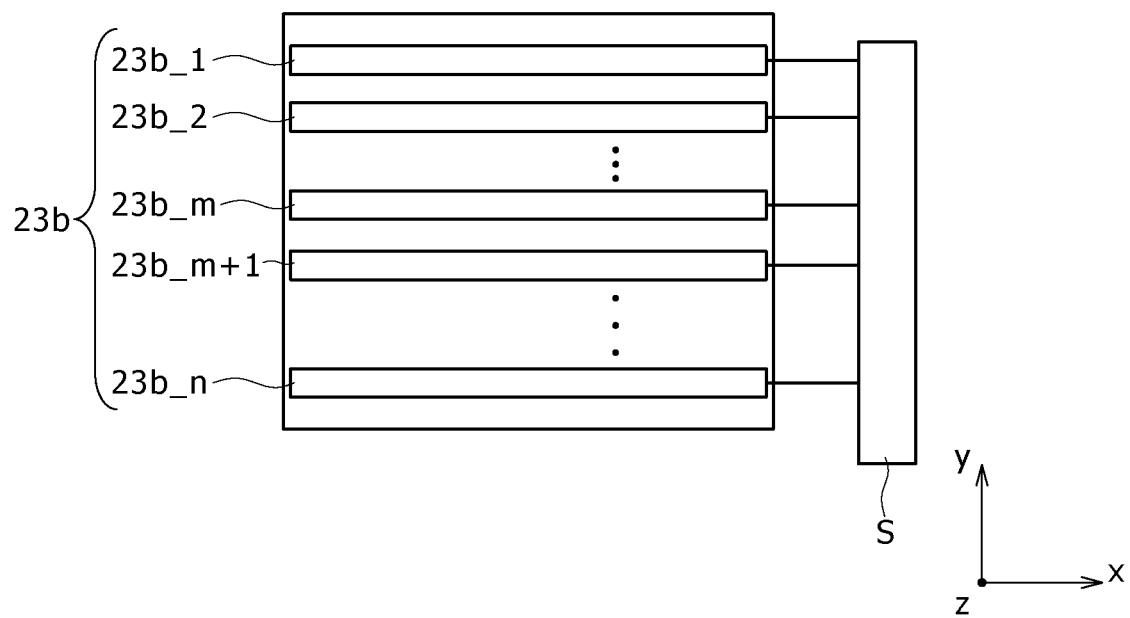
FIG. 16 is a diagram showing the detailed configuration of counter electrodes in the second embodiment of the present invention.

FIG. 16 is a diagram showing the detailed configuration of the counter electrodes 23*b* in the second embodiment of the present invention. FIG. 16 is a top view of the counter electrodes 23*b*.

As shown in FIG. 16, the counter electrodes 23*b* are in a stripe manner and extend along the horizontal direction x similarly to the first embodiment. Furthermore, the counter electrodes 23*b* are so disposed that plural electrodes are arranged at intervals in the vertical direction y. Specifically, n electrodes, i.e. first to n-th counter electrodes 23*b*_1 to 23*b*_*n*, are provided as the counter electrodes 23*b* in the direction from the upper side toward the lower side. In this configuration, the plural counter electrodes 23*b* are disposed with an equivalent interval in such a manner as to be opposed to each of the plural pixel electrodes 62*pb* arranged along the vertical direction y.

Each of the first to n-th counter electrodes 23*b*_1 to 23*b*_*n* is electrically connected to a sensor driver S as shown in FIG. 16, similarly to the first embodiment. Each of the first to n-th counter electrodes 23*b*_1 to 23*b*_*n* is sequentially selected to be supplied with a drive signal Sg output from the sensor driver S. That is, each of the first to n-th counter electrodes 23*b*_1 to 23*b*_*n* is supplied with the drive signal Sg based on line-sequential scan driving.

Although not shown in the diagram, alignment treatment of the liquid crystal layer 203 is so performed that the longitudinal direction of the liquid crystal molecules is set parallel to the direction of the xy plane, across which the TFT array substrate 201 and the counter substrate 202 are opposed to each other. That is, the liquid crystal layer 203 is so formed that the liquid crystal molecules are horizontally aligned.

In image displaying in the above-described liquid crystal panel 200*b*, a lateral electric field is applied to the liquid crystal layer 203 by the pixel electrodes 62*pb* and the counter electrodes 23*b* and the alignment of the liquid crystal molecules in the liquid crystal layer 203 changes, so that the light passing through the liquid crystal layer 203 is modulated.

The operation of detecting the position at which a sensing object F such as a finger of the user is brought into contact with the display area PA of the liquid crystal panel 200*b* is carried out similarly to the operation in the first embodiment.

(B) Summary

As above, the liquid crystal panel 200*b* of the present embodiment is based on the FFS system, and image displaying is carried out through application of a lateral electric field to the liquid crystal layer 203. Furthermore, as described above, the operation of detection of the touch position is carried out similarly to the operation in the first embodiment.

In the present embodiment, a slit KK is formed in the surface of a detecting electrode 24 opposed to the counter electrode 23*b*. Thus, similarly to the first embodiment, the detection sensitivity of the touch sensor TS can be enhanced, and detection of the touch position of a sensing object can be carried out with high accuracy.

Therefore, the present embodiment can carry out the detection of the touch position of a sensing object with high accuracy.

The same configuration can be employed for, besides the FFS system, another mode in which a lateral electric field is applied to the liquid crystal layer 203, such as the in-plane-switching (IPS) system. Also in this case, the same advantages can be achieved.

3. Third Embodiment

A third embodiment of the present invention will be described below.

Figure 17:
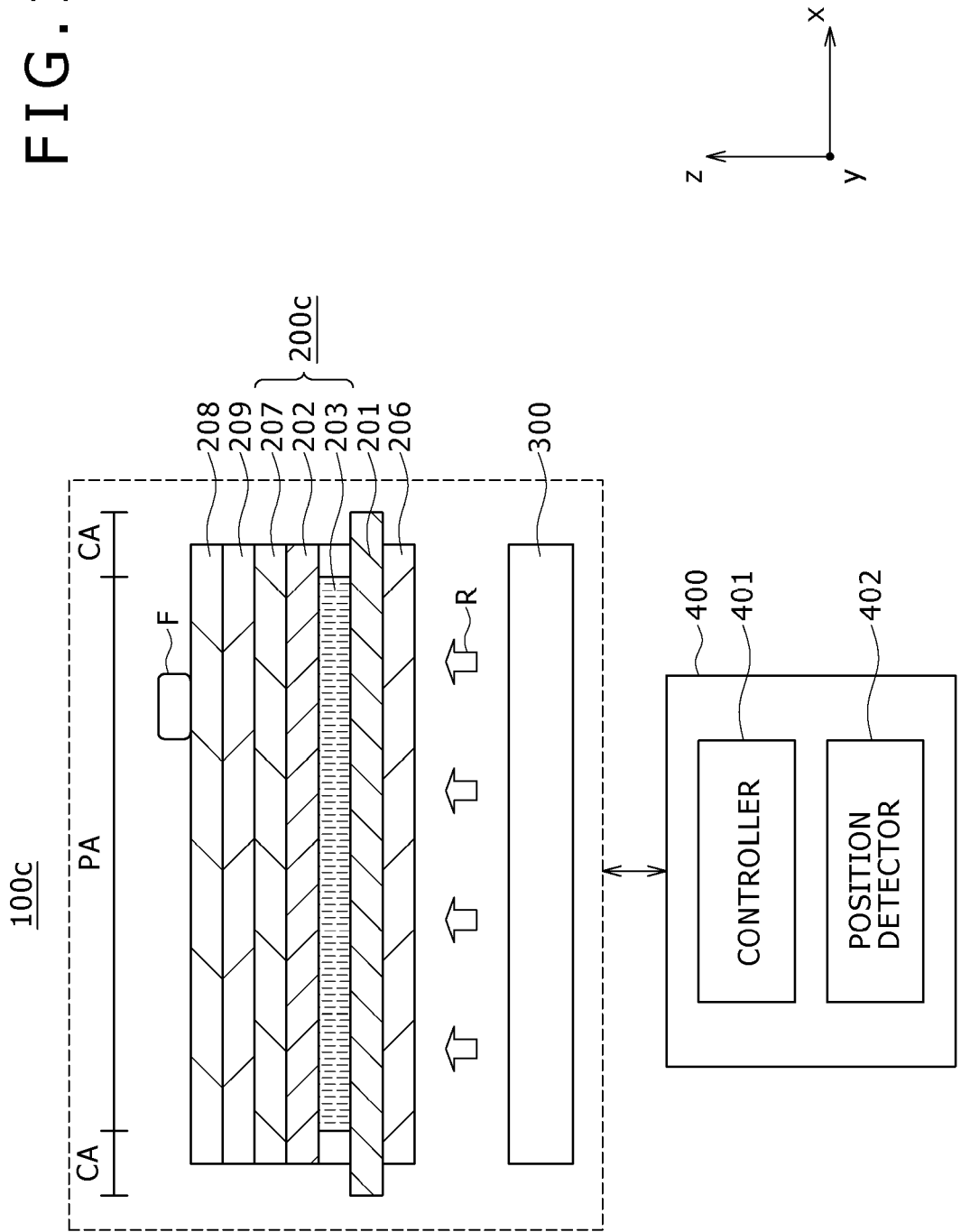
FIG. 17 is a diagram showing the outline of the configuration of a display device in a third embodiment of the present invention.

FIG. 17 is a diagram showing the outline of the configuration of a display device 100*c* in the third embodiment of the present invention.

As shown in FIG. 17, in the display device 100*c* of the present embodiment, a liquid crystal panel 200*c* is different from the liquid crystal panel 200 in the first embodiment. Furthermore, a touch panel 209 is further disposed over the liquid crystal panel 200*c*. Except for these points and points relating thereto, the third embodiment is the same as the first embodiment. Therefore, description of the overlapping part is omitted.

(A) Configuration of Liquid Crystal Panel

The configuration of the liquid crystal panel 200*c* will be described.

Figure 18:
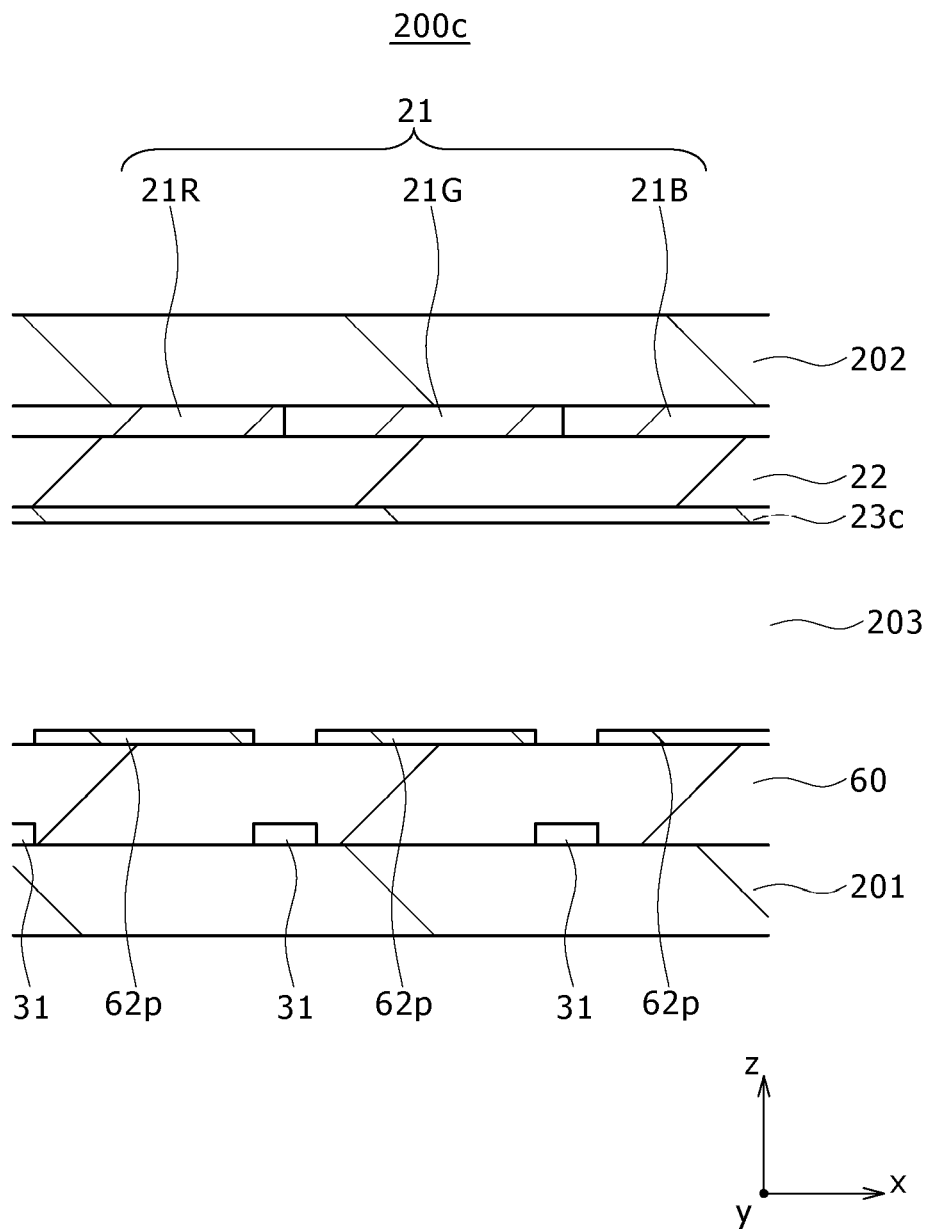
FIG. 18 is a diagram showing the configuration of a liquid crystal panel in the third embodiment of the present invention.

FIG. 18 is a diagram showing the configuration of the liquid crystal panel 200*c* in the third embodiment of the present invention. FIG. 18 is a sectional view schematically showing the outline of pixels P.

As shown in FIG. 18, the touch sensors TS are not provided in the liquid crystal panel 200*c* differently from the first embodiment.

Therefore, the detecting electrodes 24 (see FIG. 3) included in the touch sensors TS are not provided over the counter substrate 202 included in the liquid crystal panel 200*c*.

Furthermore, a counter electrode 23*c* is not formed as plural electrodes separated from each other differently from the first embodiment. Although not shown in the diagram, in the present embodiment, the counter electrode 23*c* is formed in a blanket film manner on a planarizing film 22 in such a manner as to monolithically cover the entire surface of a display area PA in which plural pixel electrodes 62*p* are arranged. In image displaying, a common potential Vcom is applied to the counter electrode 23*c*.

(B) Configuration of Touch Panel

The configuration of the touch panel 209 will be described.

Figure 19:
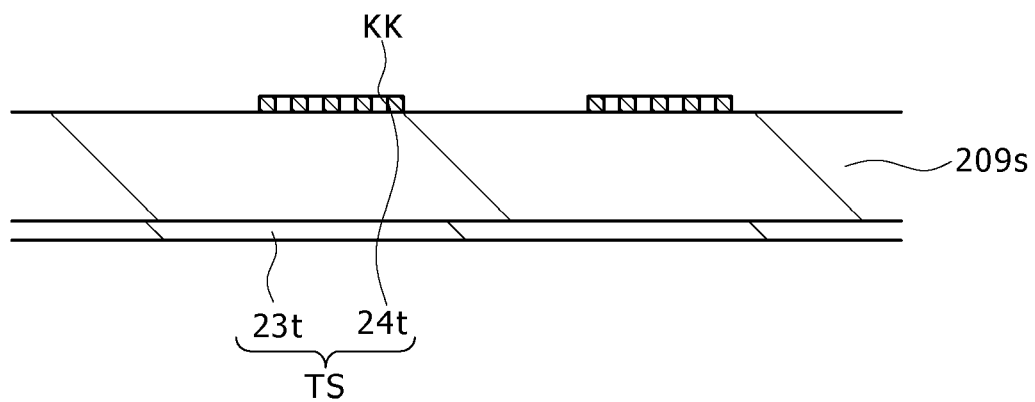
FIG. 19 is a diagram showing the configuration of a touch panel in the third embodiment of the present invention.

FIG. 19 is a diagram showing the configuration of the touch panel 209 in the third embodiment of the present invention. FIG. 19 schematically shows a section of the touch panel 209.

As shown in FIG. 19, the touch panel 209 includes a touch panel substrate 209s.

In the touch panel 209, the touch panel substrate 209s is a substrate composed of an optically-transparent insulator and is formed of e.g. glass. In the touch panel substrate 209s, touch sensors TS are provided as shown in FIG. 19.

The touch sensor TS is provided by sandwiching of the touch panel substrate 209s as a dielectric substance by a counter electrode 23t and a detecting electrode 24t as shown in FIG. 19, and forms the capacitive touch panel 209. That is, the touch sensor TS is so configured that the electrostatic capacitance changes when a sensing object (not shown) is brought close to the detecting electrode 24t.

In the touch sensor TS, the counter electrode 23t is formed on the lower surface of the touch panel substrate 209s as shown in FIG. 19. The counter electrode 23t is a transparent electrode that transmits visible light and is formed by using e.g. ITO similarly to the first embodiment.

Figure 20:
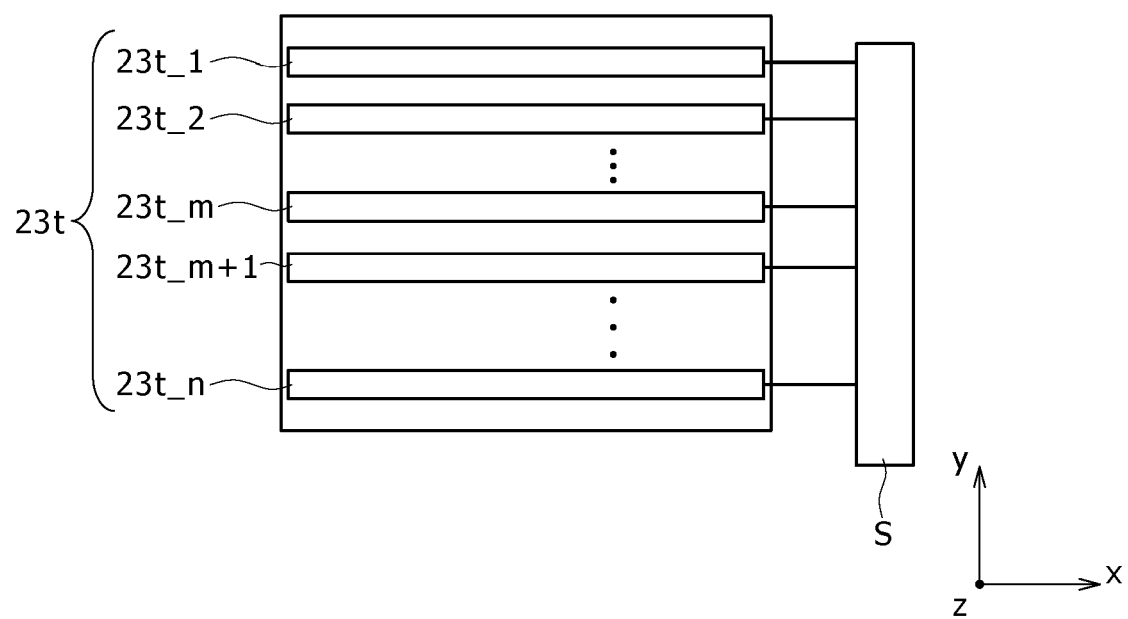
FIG. 20 is a diagram showing the detailed configuration of counter electrodes in the third embodiment of the present invention.

FIG. 20 is a diagram showing the detailed configuration of the counter electrodes 23t in the third embodiment of the present invention. FIG. 20 is a top view of the counter electrodes 23t.

As shown in FIG. 20, the counter electrodes 23t are in a stripe manner and extend along the horizontal direction x on the surface of the touch panel substrate 209s similarly to the first embodiment. Furthermore, the counter electrodes 23t are so disposed that plural electrodes are arranged at intervals in the vertical direction y. Specifically, n electrodes, i.e. first to n-th counter electrodes $23t\_1$ to $23t\_n$, are provided as the counter electrodes 23t in the direction from the upper side toward the lower side.

Each of the first to n-th counter electrodes $23t\_1$ to $23t\_n$ is electrically connected to a sensor driver S as shown in FIG. 20 and is sequentially selected to be supplied with a drive signal Sg output from the sensor driver S, similarly to the first embodiment. That is, each of the first to n-th counter electrodes $23t\_1$ to $23t\_n$ is supplied with the drive signal Sg based on line-sequential scan driving. Similarly to the first embodiment, the drive signal Sg having the common potential Vcom is supplied.

In the touch sensor TS, the detecting electrode 24t is formed on the upper surface of the touch panel substrate 209s as shown in FIG. 19. The detecting electrode 24t is a transparent electrode that transmits visible light and is formed by using e.g. ITO.

Figure 21:
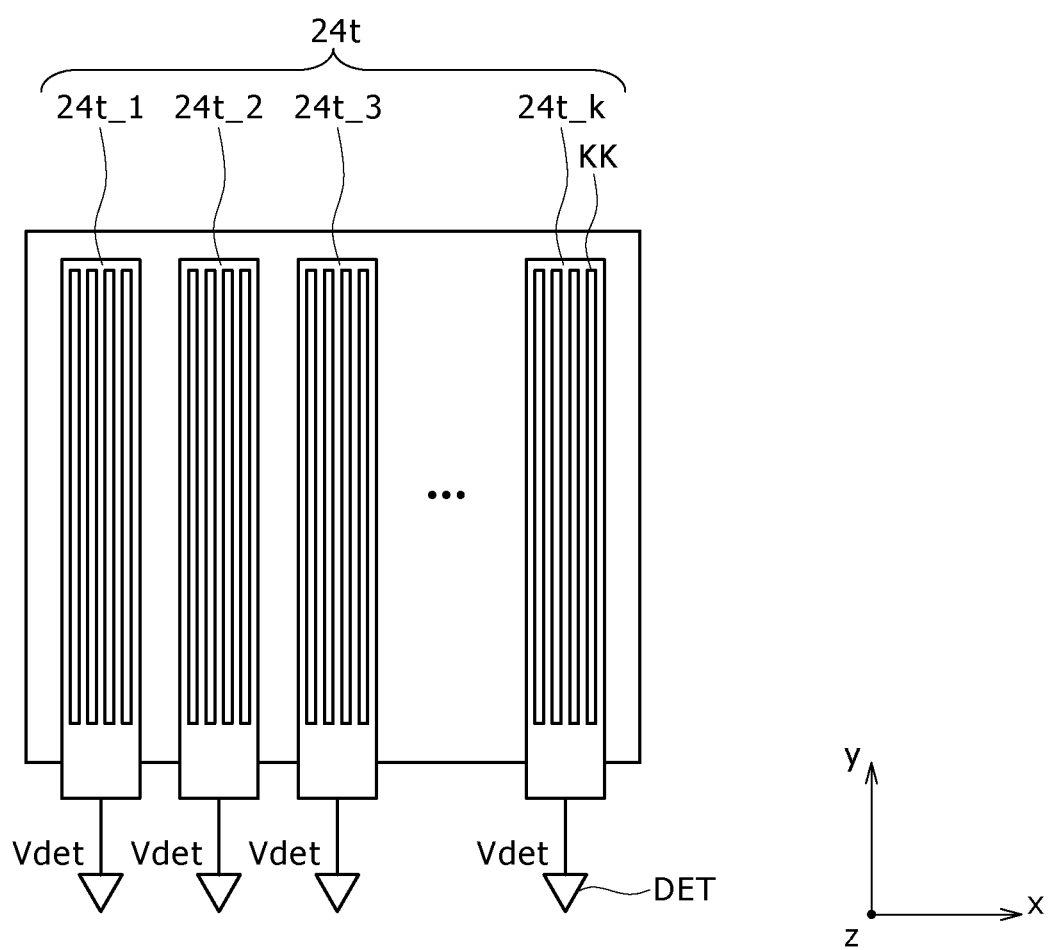
FIG. 21 is a diagram showing the detailed configuration of detecting electrodes in the third embodiment of the present invention.

FIG. 21 is a diagram showing the detailed configuration of the detecting electrodes 24t in the third embodiment of the present invention. FIG. 21 is a top view of the detecting electrodes 24t.

As shown in FIG. 21, the detecting electrodes 24t are in a stripe manner and extend along the vertical direction y on the surface of the touch panel substrate 209s similarly to the first embodiment. Furthermore, the detecting electrodes 24t are so disposed that plural electrodes are arranged at intervals in the horizontal direction x. Specifically, k electrodes, i.e. first to k-th detecting electrodes $24t\_1$ to $24t\_k$, are provided as the detecting electrodes 24t in the direction from the left side toward the right side.

Each of the first to k-th detecting electrodes $24t\_1$ to $24t\_k$ is electrically connected to a detector DET as shown in FIG. 21, and outputs a detection signal Vdet to the detector DET.

Furthermore, as shown in FIG. 21, slits KK are formed in the surface of each of the detecting electrodes 24t opposed to the counter electrodes 23t similarly to the first embodiment. The slits KK extend along the vertical direction y inside each detecting electrode 24t and are so provided that plural slits are arranged at intervals in the horizontal direction x.

In the touch panel 209 of the present embodiment, the touch sensors TS are driven and the touch position is detected similarly to the first embodiment.

Specifically, some of the plural counter electrodes 23t are selected and supplied with the drive signal Sg. Furthermore, the counter electrodes 23t as the selected electrodes are shifted in the vertical direction y and the drive signal Sg is supplied similarly. This operation is repeatedly carried out, so that the touch position is detected.

(C) Summary

As above, in the touch panel 209 of the present embodiment, the operation of detection of the touch position is carried out similarly to the first embodiment as described above.

In the present embodiment, the slits KK are formed in the surface of the detecting electrode 24t opposed to the counter electrode 23t. Thus, similarly to the first embodiment, the detection sensitivity of the touch sensor TS can be enhanced, and the touch position of a sensing object can be detected with high accuracy.

Consequently, the present embodiment can carry out the detection of the touch position of the sensing object with high accuracy.

<4. Fourth Embodiment>

A fourth embodiment of the present invention will be described below.

Figure 22:
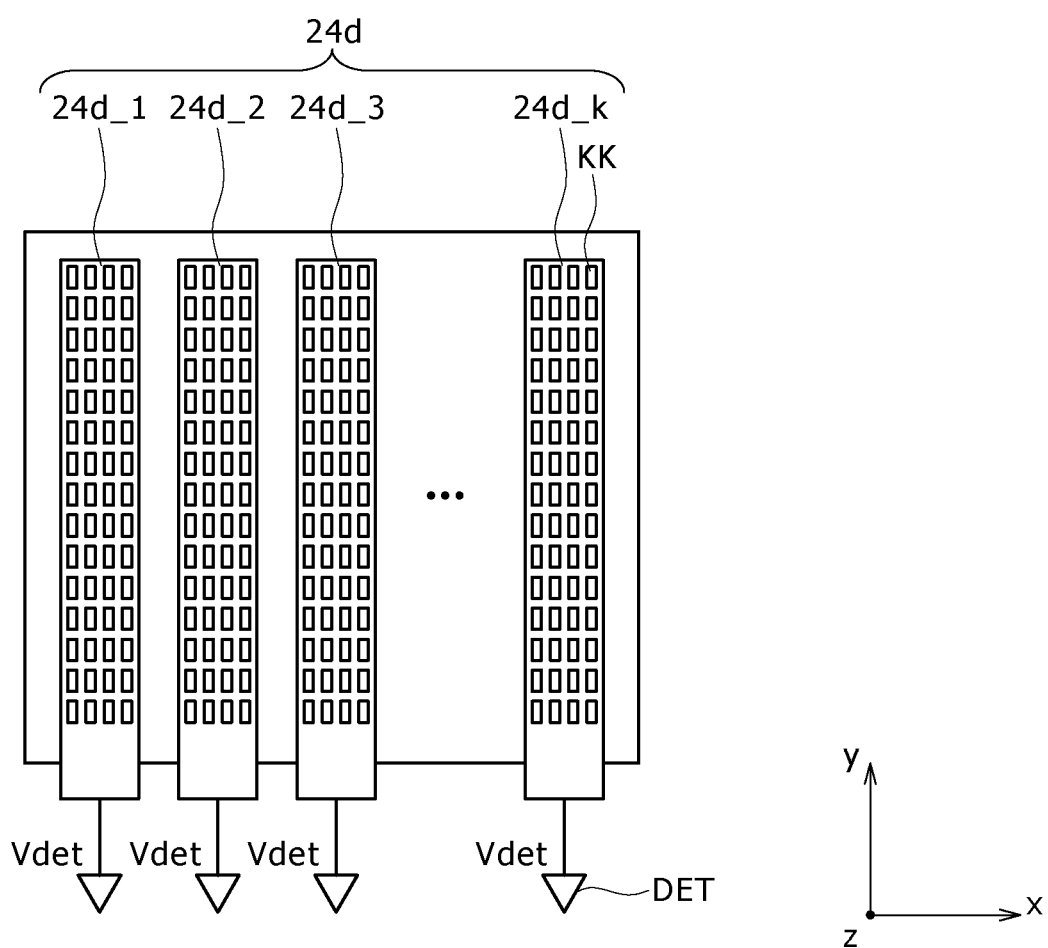
FIG. 22 is a diagram showing the detailed configuration of detecting electrodes in a fourth embodiment of the present invention.

FIG. 22 is a diagram showing the detailed configuration of detecting electrodes 24d in the fourth embodiment of the present invention. FIG. 22 is a top view of the detecting electrodes 24d.

As shown in FIG. 22, the detecting electrodes 24d in the present embodiment are different from the detecting electrodes 24 in the first embodiment. Except for this point and points relating thereto, the fourth embodiment is the same as the first embodiment. Therefore, description of the overlapping part is omitted.

(A) Detecting Electrode

As shown in FIG. 22, the detecting electrodes 24d are in a stripe manner and extend along the vertical direction y. Furthermore, the detecting electrodes 24d are so disposed that plural electrodes are arranged at intervals in the horizontal direction x. Specifically, k electrodes, i.e. first to k-th detecting electrodes $24d\_1$ to $24d\_k$, are provided as the detecting electrodes 24d in the direction from the left side toward the right side.

In the detecting electrodes 24d, slits KK are formed. The slits KK extend along the vertical direction y inside each detecting electrode 24d and are so provided that plural slits are arranged at intervals in the vertical direction y and the horizontal direction x. That is, the slits KK having a rectangular shape are formed in a lattice manner.

(B) Summary

As above, in the present embodiment, the slits KK having a rectangular shape are formed in a lattice manner in the detecting electrodes 24d in such a way that beams intersect with each other inside the detecting electrodes 24d. This can prevent the occurrence of breaking in the detecting electrodes 24d. In particular, even if a pattern processing defect occurs in the manufacturing, the occurrence of breaking can be prevented because many connected parts exist inside the detecting electrode 24d.

<5. Fifth Embodiment>

A fifth embodiment of the present invention will be described below.

Figure 23:
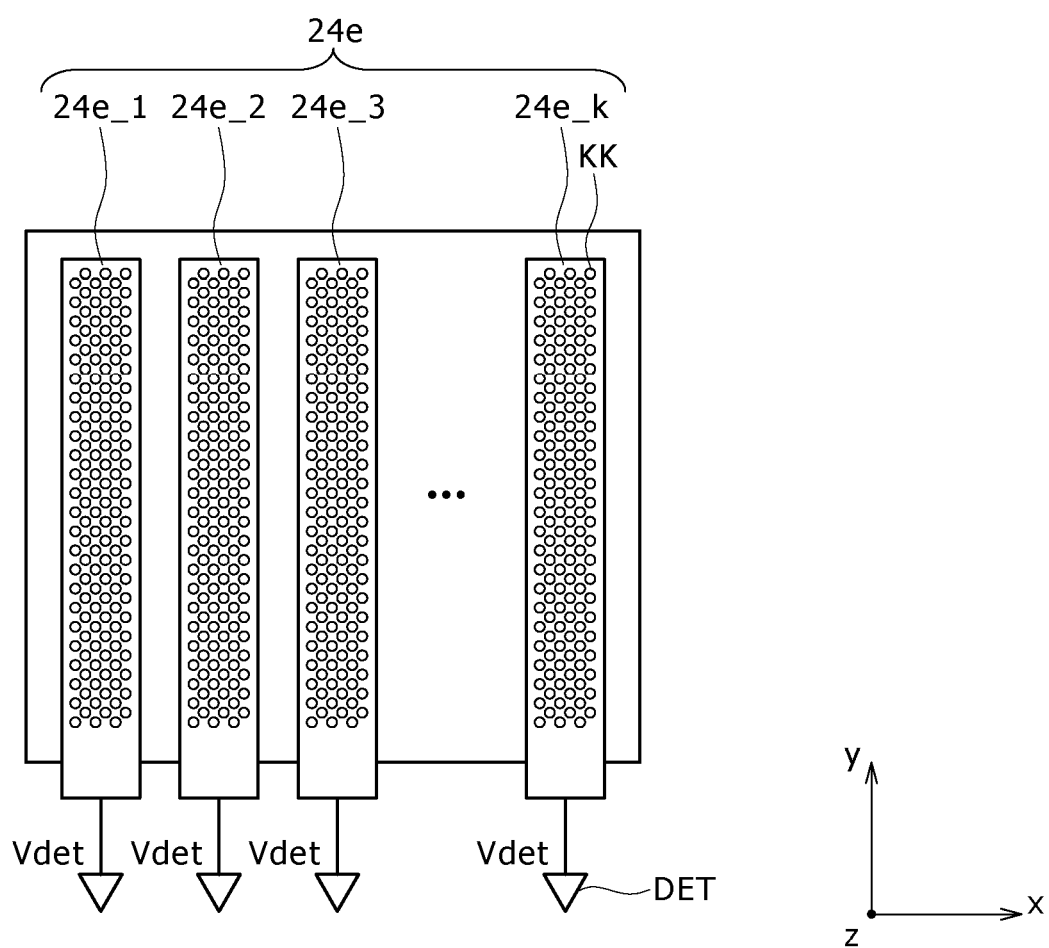
FIG. 23 is a diagram showing the detailed configuration of detecting electrodes in a fifth embodiment of the present invention.

FIG. 23 is a diagram showing the detailed configuration of detecting electrodes 24e in the fifth embodiment of the present invention. FIG. 23 is a top view of the detecting electrodes 24e.

As shown in FIG. 23, the detecting electrodes 24e in the present embodiment are different from the detecting electrodes 24 in the first embodiment. Except for this point and points relating thereto, the fifth embodiment is the same as the first embodiment. Therefore, description of the overlapping part is omitted.

(A) Detecting Electrode

As shown in FIG. 23, the detecting electrodes 24e are in a stripe manner and extend along the vertical direction y. Furthermore, the detecting electrodes 24e are so disposed that plural electrodes are arranged at intervals in the horizontal direction x. Specifically, k electrodes, i.e. first to k-th detecting electrodes 24e_1 to 24e_k, are provided as the detecting electrodes 24e in the direction from the left side toward the right side.

In the detecting electrodes 24e, slits KK are formed. The slits KK are formed into a circular shape inside each detecting electrode 24e and are so provided that plural slits are arranged at intervals in the vertical direction y and the horizontal direction x.

(B) Summary

As above, in the present embodiment, the slits KK having a circular shape are formed in the detecting electrodes 24e. Thus, the fringe electric field is generated more uniformly between the detecting electrodes 24e and the scanning electrodes.

Therefore, the present embodiment can carry out detection of the touch position of a sensing object with high accuracy.

The slits KK may be formed into any of various shapes besides the above-described shapes.

FIG. 24 is a diagram showing the detailed configuration of detecting electrodes in modification examples of the embodiments of the present invention. FIG. 24 is a top view of the detecting electrodes.

Figures 24A, 24B, 24C, 24D:
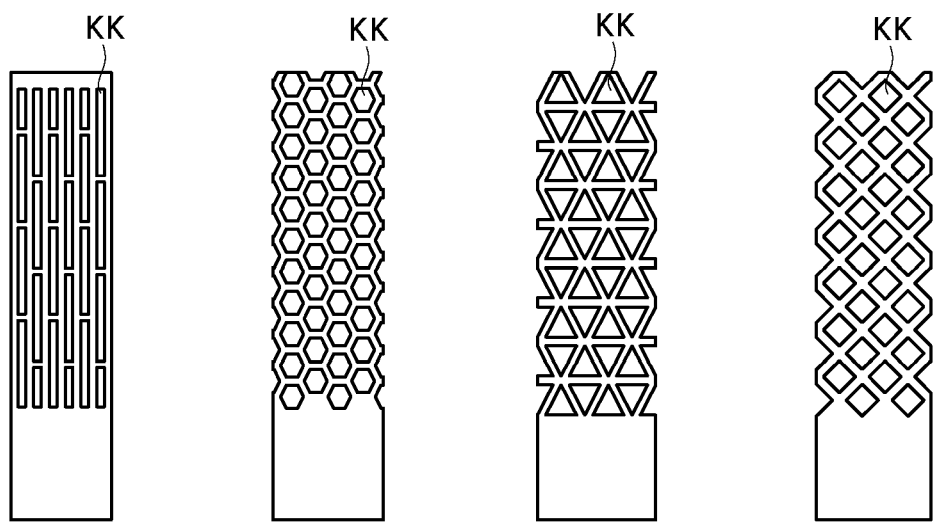
FIGS. 24A to 24D are diagrams showing the detailed configurations of detecting electrodes in modification examples of the embodiments of the present invention.

As shown in FIG. 24A, slits KK having a rectangular shape may be so formed that the ends thereof in the vertical direction y are at positions different from each other in the horizontal direction x.

As shown in FIG. 24B, slits KK having a hexagonal shape may be so provided as to be arranged in a honeycomb manner.

Furthermore, as shown in FIG. 24C, slits KK having an equilateral triangular shape may be so disposed that the slits KK are alternately turned upside down in the horizontal direction x and the groups of the slits KK are alternately symmetric with each other in the vertical direction y.

Moreover, as shown in FIG. 24D, slits KK having a rhombic shape may be so formed as to be disposed along the vertical direction y and the horizontal direction x.

<6. Others>

The mode for carrying out the present invention is not limited to the above-described embodiments, but various modified modes, such as combination of features of the respective embodiments, can be employed.

In the driving of the touch sensor in the above-described embodiments, the operation of AC-driving the counter electrodes is repeatedly carried out with the shift in the vertical direction, in which the plural (n) counter electrodes are arranged. In this AC-driving operation, consecutive plural (m(m<n)) counter electrodes are selected and simultaneously AC-driven. In this operation, the plural (m(m<n)) counter electrodes are so selected as to include the counter electrodes used in the pixel driving operation. Furthermore, in consecutive AC-driving operation, the above-described shift is so carried out that at least one counter electrode is continuously AC-driven. However, the driving of the touch sensor is not limited to this operation. For example, the above-described operation of AC-driving may be carried out for each counter electrode one by one.

In the above-described embodiments, the touch sensor is formed in the display area of the liquid crystal panel. However, the configuration is not limited thereto but the embodiments may be applied to a configuration in which the touch sensor is formed in the peripheral area of the liquid crystal panel.

In the above-described embodiments, the liquid crystal panel is a transmissive panel. However, the configuration is not limited thereto but the embodiments may be applied to a configuration in which the liquid crystal panel is a reflective panel or a semi-transmissive panel that allows use of both a transmissive type and a reflective type.

Furthermore, the embodiments of the present invention may be applied to a display panel other than the liquid crystal panel, such as an organic EL display.

The display device 100 and so on of the embodiments can be used as a unit in various kinds of electronic apparatus.

FIGS. 25 to 29 are diagrams showing electronic apparatus to which the display device 100 according to the embodiment of the present invention is applied.

Figure 25:
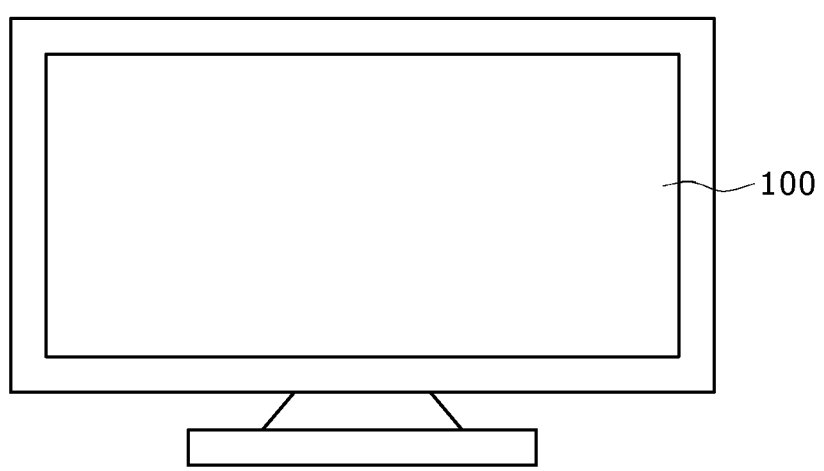
FIG. 25 is a diagram showing electronic apparatus to which the display device of the embodiment of the present invention is applied.

As shown in FIG. 25, in television apparatus for receiving and displaying television broadcasting, the display device 100 can be used as a display device that displays the received images on the display screen and accepts operation commands by the operator.

Figure 26:
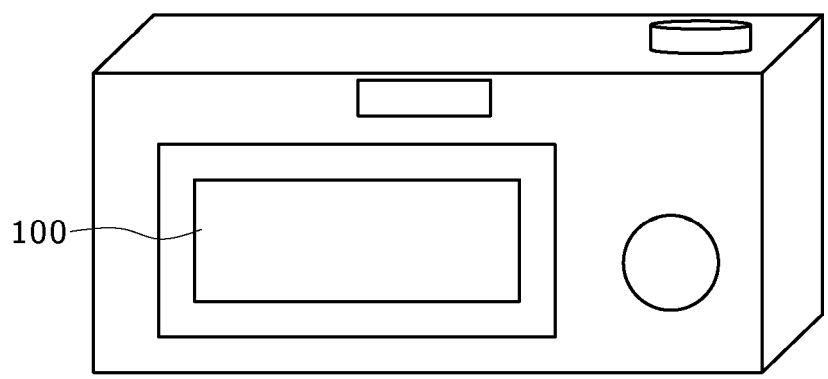
FIG. 26 is a diagram showing electronic apparatus to which the display device of the embodiment of the present invention is applied.

Furthermore, as shown in FIG. 26, in a digital still camera, the display device 100 can be used as a display device that displays images such as images captured by the camera on the display screen and accepts operation commands by the operator.

Figure 27:
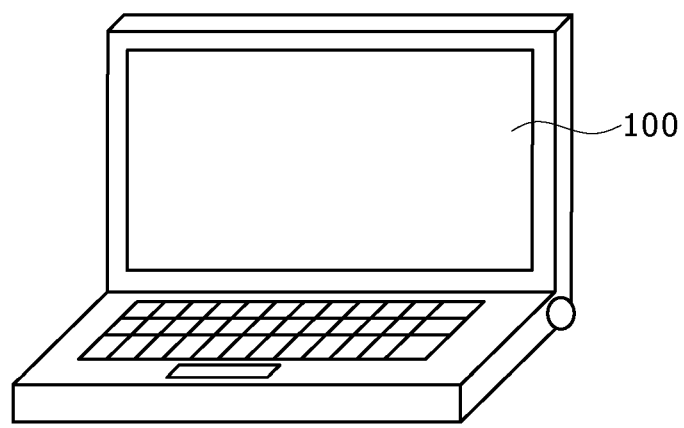
FIG. 27 is a diagram showing electronic apparatus to which the display device of the embodiment of the present invention is applied.

In addition, as shown in FIG. 27, in a notebook personal computer, the display device 100 can be used as a display device that displays operation images and so forth on the display screen and accepts operation commands by the operator.

Figure 28:
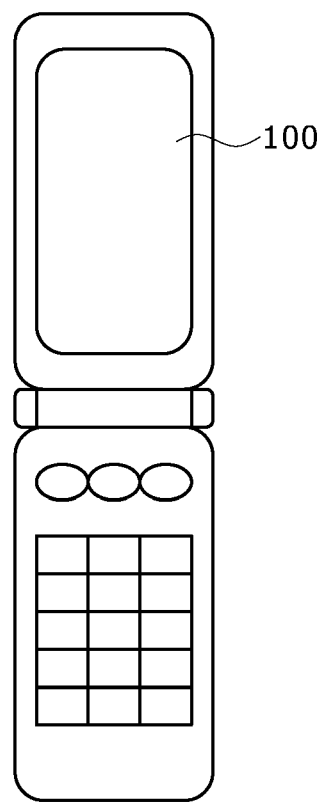
FIG. 28 is a diagram showing electronic apparatus to which the display device of the embodiment of the present invention is applied.

Moreover, as shown in FIG. 28, in a cellular phone terminal, the display device 100 can be used as a display device that displays operation images and so forth on the display screen and accepts operation commands by the operator.

Figure 29:
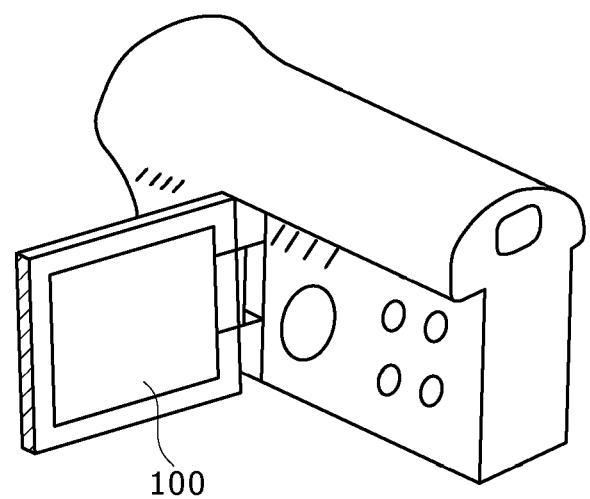
FIG. 29 is a diagram showing electronic apparatus to which the display device of the embodiment of the present invention is applied.

Furthermore, as shown in FIG. 29, in a video camcorder, the display device 100 can be used as a display device that displays operation images and so forth on the display screen and accepts operation commands by the operator.

In the above-described embodiments, the counter electrodes 23, 23b, 23c, and 23t are equivalent to the scanning electrode and the common electrode set forth in the claims. In the above-described embodiments, the detecting electrodes 24, 24t, 24d, and 24e are equivalent to the detecting electrode set forth in the claims. In the above-described embodiments, the pixel electrodes 62p and 62pb are equivalent to the pixel electrode set forth in the claims. In the above-described embodiments, the display devices 100 and 100c are equivalent to the display device and the information input device set forth in the claims. In the above-described embodiments, the liquid crystal panels 200, 200b, and 200c are equivalent to the display panel and the touch panel set forth in the claims. In the above-described embodiments, the TFT array substrate 201 is equivalent to the first substrate set forth in the claims. In the above-described embodiments, the counter substrate 202 is equivalent to the second substrate set forth in the claims. In the above-described embodiments, the liquid crystal layer 203 is equivalent to the liquid crystal layer set forth in the claims. In the above-described embodiment, the touch panel 209 is equivalent to the touch panel set forth in the claims. In the above-described embodiments, the slit KK is equivalent to the slit set forth in the claims. In the above-described embodiments, the touch sensor TS is equivalent to the touch sensor set forth in the claims.

The present application contains subject matter related to that disclosed in Japanese Priority Patent Application JP 2009-102319 filed in the Japan Patent Office on Apr. 20, 2009, the entire content of which is hereby incorporated by reference.

What is claimed is:

1. An information input device comprising:
   a touch panel having a touch sensor that detects a position at which a sensing object is in proximity to a sensing surface, the touch sensor including (i) a plurality of scanning electrodes extending along a first direction, (ii) a detecting electrode that is opposed to the scanning electrodes and extends along a second direction orthogonal to and intersecting the first direction, and (iii) a dielectric substance between the scanning electrodes and the detecting electrode, the touch sensor being a capacitive sensor with an electrostatic capacitance that changes when the sensing object is in proximity to the detecting electrode; and
   a plurality of slits formed within the detecting electrode, the slits including slits of uniform shape and size, wherein,
      the ends of the slits are closed by the detecting electrode,
      the detecting electrode has a substantially elongated rectangular shape with a length in the second direction greater than a width in the first direction, and the width is constant,
      each slit extends most of the length of the detecting electrode,
      each slit of the detecting electrode has a first edge and a second edge and extends along the second direction from the first edge to the second edge,
      a distance between the first edge and the second edge is substantially the same as a distance between a first side and a second side, the first side extending along the first direction and being an outer side of one of the two outermost scanning electrodes, and the second side extending along the first direction and being an outer side of the other outermost scanning electrode, and
      each scanning electrode has a substantially elongated shape with a length greater than a width.

2. The information input device according to claim 1, wherein the detecting electrode is a transparent electrode that transmits visible light.

3. The information input device according to claim 1, wherein:
   the scanning electrodes arranged at intervals along the second direction; and
   the touch panel includes a plurality of detecting electrodes, the length of each detecting electrode extending along the second direction, the detecting electrodes arranged at intervals in the first direction.

4. The information input device according to claim 1, wherein the first edge overlaps the first side, and the second edge overlaps the second side.

5. A display device comprising:
   a display panel having a touch sensor that detects a position to which a sensing object is in proximity with respect to a display surface for displaying an image, the touch sensor including (i) a plurality of scanning electrodes extending along a first direction, (ii) a detecting electrode that is opposed to the scanning electrode and extends along a second direction orthogonal to and intersecting the first direction, and (iii) a dielectric substance between the scanning electrodes and the detecting electrode, the touch sensor being a capacitive sensor with an electrostatic capacitance that changes when the sensing object is in proximity to the detecting electrode; and
   a plurality of slits formed within the detecting electrode, the slits including slits of uniform shape and size, wherein,
      the ends of the slits are closed by the detecting electrode,
      the detecting electrode has a substantially elongated rectangular shape with a length in the second direction greater than a width in the first direction, and the width is constant,
      each slit extends most of the length of the detecting electrode,
      each slit of the detecting electrode has a first edge and a second edge and extends along the second direction from the first edge to the second edge,
      a distance between the first edge and the second edge is substantially the same as a distance between a first side and a second side, the first side extending along the first direction and being an outer side of one of the two outermost scanning electrodes, and the second side extending along the first direction and being an outer side of the other outermost scanning electrode, and
      each scanning electrode has a substantially elongated shape with a length greater than a width.

6. The display device according to claim 5, wherein the display panel is a liquid crystal panel that includes a first substrate, a second substrate opposed to the first substrate, and a liquid crystal layer provided between the first substrate and the second substrate.

7. The display device according to claim 6, wherein:
   the detecting electrode is provided on a surface of the first substrate on an opposite side to a surface of the first substrate opposed to the second substrate; and
   the scanning electrodes are provided between the first substrate and the second substrate in such a manner as to be opposed to the detecting electrode with the first substrate between the detecting electrode and the scanning electrodes.

8. The display device according to claim 7 wherein:
   the length of each scanning electrode extending along the first direction on a surface across which the first substrate is opposed to the second substrate, the scanning electrodes arranged at intervals in the second direction; and the display device includes a plurality of detecting electrodes, the length of each detecting electrode extending along the second direction, the detecting electrodes arranged at intervals along the first direction.

9. The display device according to claim 8, wherein:

the display panel includes (a) a plurality of pixel electrodes arranged in a display area, and (b) a common electrode provided at an interval from the pixel electrodes in the display area; and the scanning electrodes are used as the common electrode.

10. A display device comprising:

a display panel having a touch sensor that detects a position to which a sensing object is in proximity with respect to a display surface for displaying an image, the touch sensor including (i) a plurality of scanning electrodes extending along a first direction and (ii) a detecting electrode that is opposed to the display surface and extends along a second direction orthogonal to and intersecting the first direction, and the touch sensor being a capacitive sensor with an electrostatic capacitance that changes when the sensing object is in proximity to the detecting electrode; and a plurality of slits formed within the detecting electrode, wherein, the ends of the slits are closed by the detecting electrode, the detecting electrode has a substantially elongated shape with a length in the second direction greater than a width in the first direction, and the width is constant, each slit extends most of the length of the detecting electrode, each slit of the detecting electrode has a first edge and a second edge and extends along the second direction from the first edge to the second edge, and a distance between the first edge and the second edge is substantially the same as a distance between a first side and a second side, the first side extending along the first direction and being an outer side of one of the two outermost scanning electrodes, and the second side extending along the first direction and being an outer side of the other outermost scanning electrode.

* * * * *